US009288148B1

(12) United States Patent
Krishnaswamy et al.

(10) Patent No.: US 9,288,148 B1
(45) Date of Patent: Mar. 15, 2016

(54) HIERARCHICAL NETWORK, SERVICE AND APPLICATION FUNCTION VIRTUAL MACHINE PARTITIONING ACROSS DIFFERENTIALLY SENSITIVE DATA CENTERS

(71) Applicant: International Business Machines Corporation, Armonk, NY (US)

(72) Inventors: Dilip Krishnaswamy, Bangalore (IN); Ravi Kothari, Bangalore (IN); Vijay Gabale, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/528,557

(22) Filed: Oct. 30, 2014

(51) Int. Cl.
| | |
|---|---|
| G06K 7/10 | (2006.01) |
| H04L 12/803 | (2013.01) |
| H04L 12/26 | (2006.01) |
| H04L 12/24 | (2006.01) |

(52) U.S. Cl.
CPC .......... *H04L 47/125* (2013.01); *H04L 41/0893* (2013.01); *H04L 43/0876* (2013.01)

(58) Field of Classification Search
CPC ............. G06K 2207/1012; G06K 2207/1018; G06K 7/10851; G06K 17/0022; G06K 7/14
USPC ............ 709/217; 235/462.31, 462.15, 462.25
See application file for complete search history.

(56) References Cited

U.S. PATENT DOCUMENTS

| | | |
|---|---|---|
| 2014/0098673 A1 | 4/2014 | Lee et al. |
| 2014/0200036 A1 | 7/2014 | Egner et al. |
| 2015/0304450 A1* | 10/2015 | van Bemmel ........... H04L 67/32 709/217 |

OTHER PUBLICATIONS

Mehraghdam et al. Specifying and Placing Chains of Virtual Network Functions, Cornell University Library, Jun. 4, 2014.
Liu et al. Service Function Chaining (SFC) Use Cases, Network Working Group, Apr. 21, 2014.
European Telecommunications Standards Institute (ETSI), Network Functions Virtualisation (NFV); Use Cases, 2013.
Carra, Controlling the Delay of Small Flows in Datacenters, in Proceedings of DCPerf, Madrid, Spain, Jul. 2014.
Perry et al., Fastpass: A Centralized "Zero-Queue" Datacenter Network, SIGCOMM'2014, Chicago, IL, Aug. 2014.

* cited by examiner

*Primary Examiner* — Karl D Frech
(74) *Attorney, Agent, or Firm* — Ryan, Mason & Lewis, LLP

(57) ABSTRACT

Methods, systems, and computer program products for hierarchical DCS-aware network, service, and application function VM partitioning are provided herein. A method includes partitioning multiple functions, within a set of virtual machines distributed across a hierarchical network of two or more data centers, into a first set of functions and a second set of functions, wherein the first set is associated with a higher performance sensitivity measure than the second set, and wherein said partitioning is based on a desired performance sensitivity measure associated with the functions and data center sensitivity measures of the data centers; executing the first set of functions in a first data center associated with a higher data center sensitivity measure than the one or more additional data centers; and executing the second set of functions in a second data center associated with a lower data center sensitivity measure than the first data center.

27 Claims, 29 Drawing Sheets

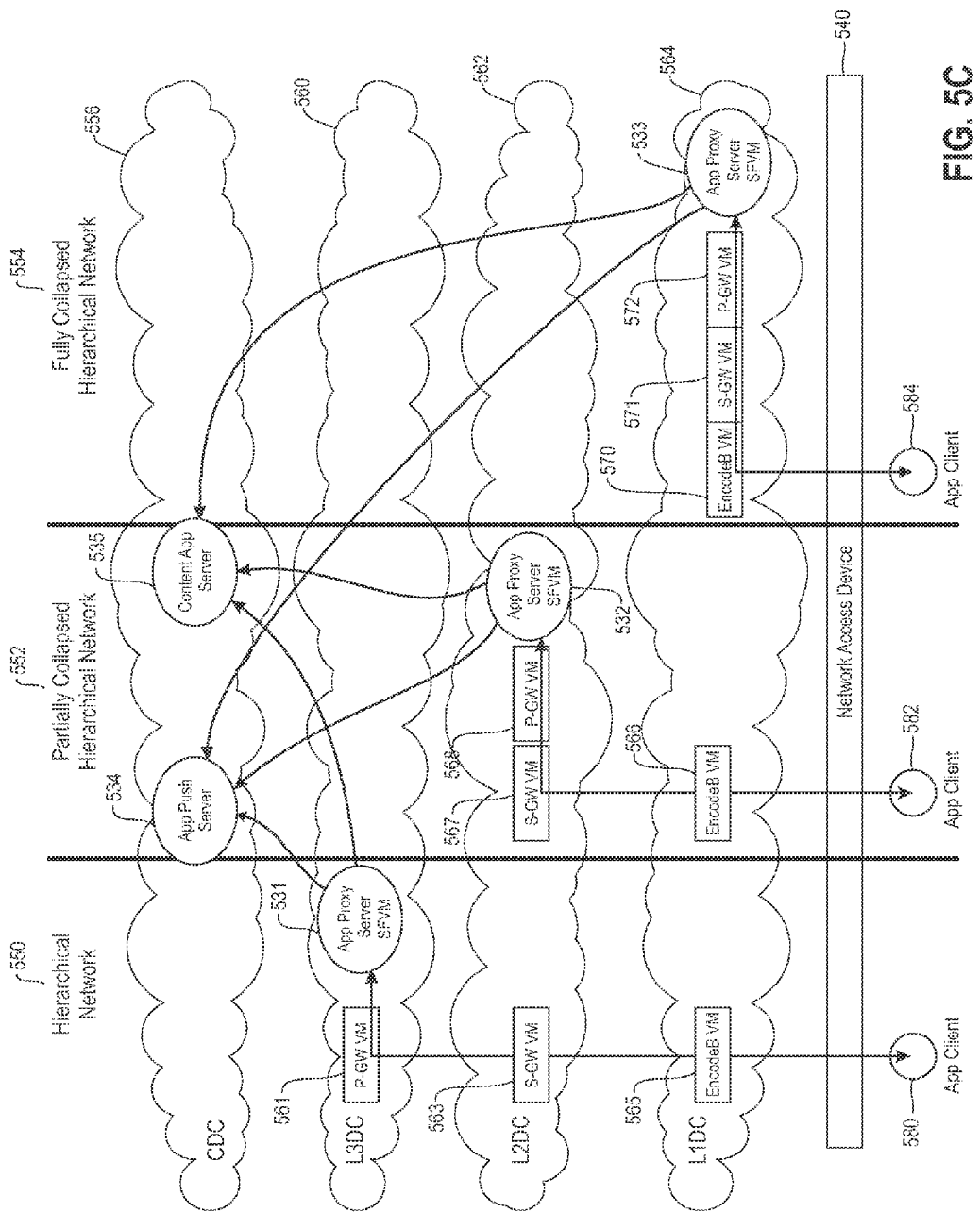

HIERARCHICAL NETWORK, SERVICE AND APPLICATION FUNCTION VIRTUAL MACHINE PARTITIONING ACROSS DIFFERENTIALLY SENSITIVE DATA CENTERS

FIELD OF THE INVENTION

Embodiments of the invention generally relate to information technology, and, more particularly, to virtualization technology.

BACKGROUND

Networks are evolving towards the virtualization of network functions, and network functions are being designed to execute in virtual machines (VMs), with such functions commonly being re-allocated to execute in a cloud data center (DC). While some existing approaches include work in the network function virtualization (NFV) area, such approaches do not include utilizing data centers placed in a hierarchy based on a differential data center sensitivity (DCS) measure to serve a set of users such as, for example, mobile devices and users in a given geographical region, or enterprise users in a given location, or a community of users in an area with limited or poor connectivity. Existing approaches also do not include partitioning options, static or dynamic function collapsing, distributed replication, concurrent processing using replicated functions, or the ability to support differentiated services in such hierarchical data centers based on differential DCS measures.

SUMMARY

In one aspect of the present invention, techniques for hierarchical DCS-measure-aware network, service, and application function VM partitioning are provided. An exemplary computer-implemented method can include steps of partitioning multiple functions, within a set of virtual machines distributed across a hierarchical network of two or more data centers, into at least a first set of functions and a second set of functions, wherein the first set of functions is associated with a higher performance sensitivity measure than the second set of functions, and wherein said partitioning is based on (i) a desired performance sensitivity measure associated with the multiple functions and (ii) data center sensitivity measures provided by the two or more data centers; executing the first set of functions in one or more of the virtual machines in a first of the two or more data centers, wherein the first data center is associated with a higher data center sensitivity measure than the one or more additional data centers in the hierarchical network of data centers; and executing the second set of functions in one or more of the virtual machines in a second of the two or more data centers, wherein the second data center is associated with a lower data center sensitivity measure than the first data center.

In another aspect of the invention, an exemplary computer-implemented method can include partitioning multiple functions, within a set of virtual machines distributed across a hierarchical network of two or more data centers and in connection with a set of multiple users, into at least a first set of functions and a second set of functions, wherein the first set of functions corresponds to a subset of one or more users associated with a given level of performance sensitivity, and wherein said partitioning is based on (i) a desired performance sensitivity measure associated with the multiple functions and (ii) data center sensitivity measures provided by the two or more data centers. The method also includes deploying differentiated services among the set of multiple users by executing the first set of functions in one or more virtual machines in a first of the two or more data centers, wherein the first data center is associated with a higher data center sensitivity measure than the one or more additional data centers in the hierarchical network of data centers; and executing the second set of functions in one or more virtual machines in a second of the two or more data centers, wherein the second data center is associated with a lower data center sensitivity measure than the first data center.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 5C is a diagram illustrating the progressive collapsing of functions with the utilization of an application proxy service function virtual machine, according to an example embodiment of the invention;

DETAILED DESCRIPTION

Figure 1A:
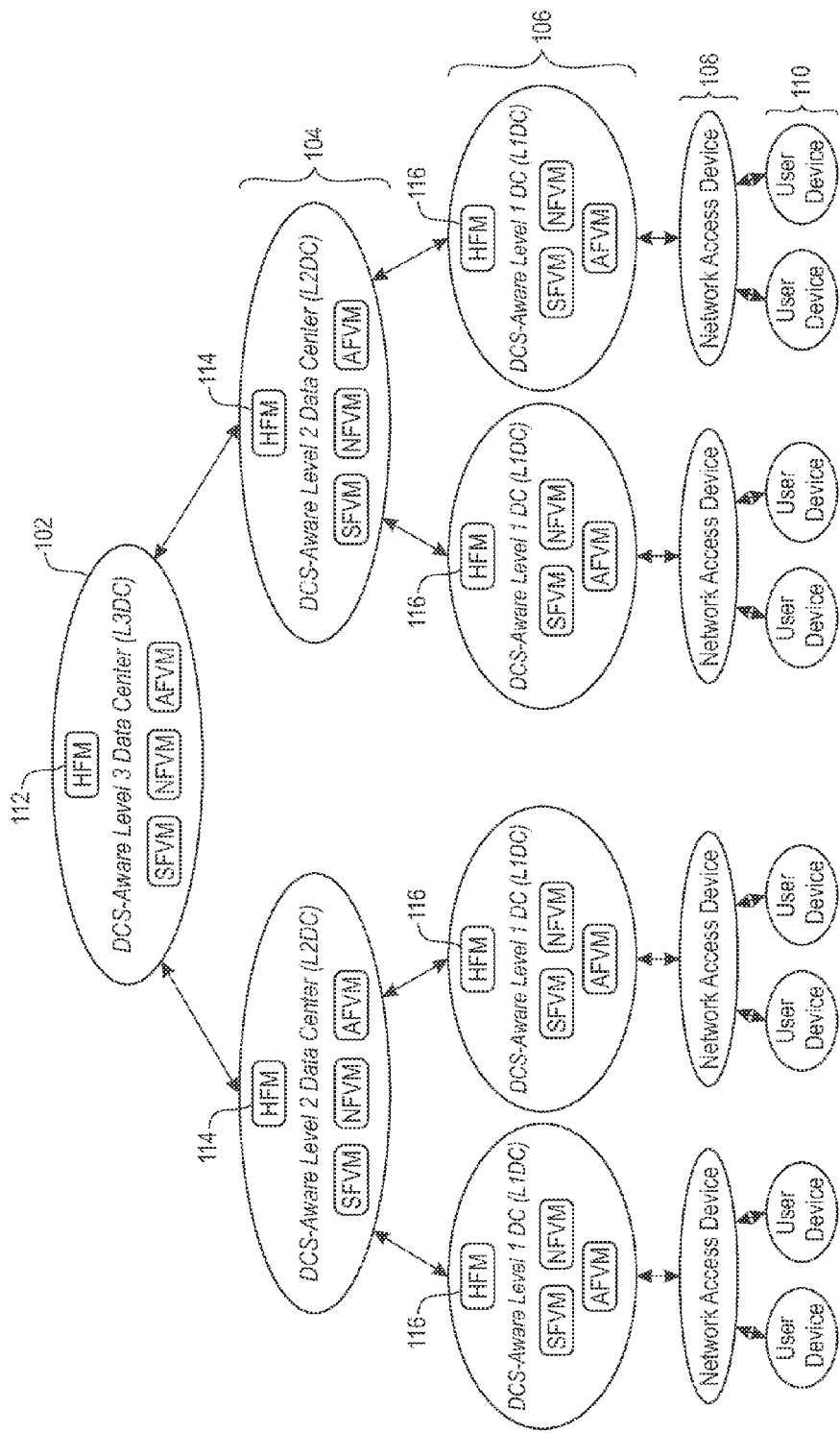
FIG. 1A through FIG. 1E include diagrams illustrating DCS-aware hierarchical data centers, according to an embodiment of the present invention.

As described herein, an aspect of the present invention includes a hierarchical DCS-aware network of data centers, with network, service and/or application function VM partitioning across a hierarchy of data centers with differentiated services. As used and detailed herein, network functions can include functions provided by a traditional hardware appliance such as a services gateway (S-GW) in a long-term evolution (LTE) network. Additionally, a network function, as used herein, can represent a traditional function such as a load balancer or a firewall implementation in a network. Service functions can include, for example, a combination of functions that help with providing a specific service such as a set of functions that can combine to provide resources within a cellular network for access (for instance, providing resources in the access network and a core network to enable access), a function to provide an authentication service in a network, and/or a service function enabling a delay-tolerant content delivery service. In at least one embodiment of the invention, new and additional service functions can also be considered such as an inter-operator tunneling service function, an application proxy VM, or a machine-to-machine (M2M) service layer VM. Also, an application function can represent an application such as an augmented reality application, an email application, a social networking application, and/or over-the-top audio/video applications.

A data center, as used herein, can include one or more physical computing and/or storage elements with the ability to connect to devices or other data centers via one or more networks. Data centers can be placed in a hierarchy wherein the connectivity between the data centers can be through different networks, such that these data centers may have a differential ability to serve users in a particular region based on the ability of the users to communicate with the data centers.

A data center can include a set of one or more nodes with computing and/or storage capability that can include multiple processors with storage memory. Each data center can have a composite DCS performance measure. Examples of DCS measures can include latency sensitivity of information exchanges, network availability, bandwidth availability, energy availability, computing capacity, storage availability and/or a combination of such measures to a set of users and/or devices. Examples of DCS measures can also include energy sensitivity, network-bandwidth-utilization sensitivity, computational-processing sensitivity, storage/memory-utilization sensitivity, network availability, a dynamic measure based on link conditions associated with one or more users, service requirements associated with the users, cost of service, and/or any combination of such sensitivity measures, and can further include time-varying values of such sensitivity values. The same data center may have a different DCS measure for the same user or set of users, based on the network being utilized to connect the data center with a user (or set of users). The same data center may also offer a different DCS measure for different sets of users depending on the location and/or service requirements associated with these different sets of users. Such users and/or devices can include mobile users in a given geographical region, enterprise users in a given location, and/or a community of users in an area with limited or poor connectivity. The inverse of an instantaneous latency or an expected latency to respond to a request can be utilized as a DCS measure based on latency sensitivity. An expected latency measure can have a mean $\mu$ and variance $\sigma$ associated therewith, such that a DCS latency sensitivity measure can be represented by $1/(\mu+k\sigma)$, wherein k can be a non-negative number, or simply via using the reciprocal of the mean $1/\mu$. A lower value of the expected latency measure would imply a higher level of DCS latency measure sensitivity.

Also, a DCS measure on network, bandwidth, computing and/or storage availability can include knowledge of the instantaneous availability of the network, bandwidth, computing and/or storage component and/or the network link performance associated with a user or set of users. Also, a DCS measure can be based on the fractional duration during a given period such as a day or a week, when the network, bandwidth, computing and/or storage component would be available, or an integration over time $\int \rho(t)dt$ of a time-varying function $\rho(t)$ on the degree of availability of a network, bandwidth, computing and/or storage component as a function of time. A higher value of such a DCS measure would imply a higher availability of the network, bandwidth, compute or storage at a data center to serve a particular community of users.

A combined DCS measure can include a sum and/or product of such measures, such as a weighted sum of normalized DCS measures, a product of such measures, and/or a product of powers of such DCS measures wherein different measures can be raised to different powers to result in a composite DCS measure for a given data center, or, more generally, any arbitrary function of such DCS measures. For example, a set of DCS measures $d_1, d_2, d_i \ldots d_n, \ldots$ can be combined by raising each measure $d_i$ to a power $\alpha_i$ to derive a combined DCS measure of the form $\prod_{i=1}^{n} d_i^{\alpha_i}$. Alternative forms and computations to combine DCS measures may also be used in one or more embodiments of the invention. Such forms can include sums and/or products of functions $f_i$ based on the DCS measures $d_1, d_2, d_i \ldots d_n, \ldots$, wherein such functions $f_i$ can be of arbitrary form such as linear functions or sigmoid functions. For example, a combined DCS measure can include a weighted sum $$\sum_{i}^{n} \alpha_i f_i(d_i),$$

wherein $\alpha_i$ can be weights on these normalized measures, such that $$\sum_{i}^{n} \alpha_i = 1,$$

and wherein $f_i(d_i)$ can be a normalized DCS measure with a value in the range [0,1] (for example, $f_i(d_i)$ can be a sigmoid function of $d_i$ such as $$\frac{1}{1+e^{-\lambda(d_i-\delta)}}$$

or a linear scaled function of $d_i$ such as $d_i/D_{i,max}$).

A combined DCS measure can be used to classify data centers based on the particular data center's ability to respond to devices in a certain geographic area or a network coverage region, as well as the particular data center's location relative to and the available connectivity to those devices. For example, let the coverage space for the data centers be given by a set of geographic and/or networked regions R:$\{R_m\}$. A geographic region is given by a geographical area or volume in space served by the data center. A networked region is a region covered by a set of network nodes that can provide access to the network users via the network comprising that set of network nodes. Multiple network regions can support the same geographic region, for example, differentially based on the ability of the respective networks to serve users (some network regions may provide faster access or higher bandwidth, whereas other network regions may provide slower access or lower bandwidth to users/devices that are served). As an example, consider data centers with different mean DCS latency sensitivity measures that serve users. Let a data center $D_k$ at location k provide a response within a mean response time $\mu_{m,k}$ (that is, the DCS latency sensitivity measure is given by $L_{m,k}=1/\mu_{m,k}$) to devices in region $R_m$. Data centers can be organized in a hierarchy with increasing mean response time with respect to a given region $R_m$. Given a set of network functions, service functions and/or application functions $f: \{f_i\}$, with expected response times of $\alpha_i$ relative to the devices in geographic region $R_m$, each function $f_i$ can be placed in an appropriate data center i such that $\mu_{m,k} \leq \alpha_i$ (in other words, the latency sensitivity $L_{m,k}=1/\mu_{m,k}$ of the data center is higher than the latency sensitivity $1/\alpha_i$ required by the function $f_i$). When multiple data centers are possible for placement of a function, the following actions can be carried out:

(a) place the function at a data center that is higher up in the hierarchy with lower latency sensitivity (higher $\mu_{m,k}$) to lower costs of placement, when the cost of hosting the function in a larger data center higher the hierarchy is lower; or (b) place the function at a data center with higher latency sensitivity (lower $\mu_{m,k}$) to deliver better performance for that function; or (c) replicate the function as needed in multiple data center locations to obtain the benefits of these locations (for example, 20% of high priority users could be supported by a data center with higher latency sensitivity (lower $\mu_{m,k}$), and 80% of the users could be supported by a data center with lower latency sensitivity (higher $\mu_{m,k}$) to reduce costs associated with supporting those users).

Function partitioning can also be based on an overall measure related to the number of round trip times (RTTs) required to execute a function, so that an amplification factor associated with the improved latency for each round trip is used to estimate an overall benefit (based on the product of the improved latency per RTT and the number of RTTs required) of executing a function.

It should be noted (and appreciated by one skilled in the art) that the above discussion with regard to latency sensitivity to optimize partitioning, replication, and placement of functions is applicable, in general, with regard to a DCS metric that can combine other metrics such as bandwidth, energy, computing power, storage availability, network availability, and costs of utilization of resources in a data center, as well as combine metrics based on dynamic variation of such measures due to a time-dependent variation of the metrics.

Additionally, some functions may be more computationally intensive (such as an augmented reality service to match a captured image with a stored set of images for a given location), whereas some functions may be more network-delay-sensitive (such as light-weight control plane network functions), and some functions many be more bandwidth-sensitive (such as a video content delivery service application). Thus, based on the performance requirements of a function, a performance sensitivity metric (similar in functional form to a DCS measure) can be defined, and if the data center sensitivity measure exceeds the performance sensitivity required for a function, then that data center is considered a candidate in the data center hierarchy to support the function.

Depending on the relative costs and the relative benefits across the metrics associated with placement in the data center hierarchy, the functions can be placed differently across the data centers. It should also be noted that a given data center may have different DCS values depending on the region of users that the data center may serve. The same data center may serve users in different regions (geographic and/or network), resulting in a different ability to serve users and/or devices in each region, which can influence whether that particular data center serves users and/or devices in those different regions. The decision-making associated with the determination of which network, service, and/or application function VMs reside in which data center can be made by a hierarchical function manager (HFM) capability provided in each data center, wherein such an HFM in a data center interacts with HFMs from other data centers to determine the placement of functions in the data center hierarchy. Additionally, in conjunction with one or more embodiments of the invention, linear, non-linear, and/or convex optimization techniques can be used to determine an optimal partitioning strategy.

A utility value may be computed using a function based on the cost of service (such as a data center service cost based on Gigabyte-hours used) and a benefit value associated with utilizing a data center with a DCS measure to support a network, service and/or application VM with a specific performance sensitivity in a specified data center in the data center hierarchy. Typically, a data center with a higher DCS value may also be more expensive to use, such that a function can utilize a data center with a lower DCS value (higher up the hierarchy) while meeting the desired performance sensitivity requirements associated with the function. For example, the difference between the DCS measure and the desired performance sensitivity measure, or the ratio of the two measures, can be taken (so that the higher the DCS measure, the higher the benefit value), or any arbitrary function of the measures can be taken as the benefit value associated with using a data center to deploy a specific function. The utility value can be computed by taking the ratio of the benefit value to the cost of service (so that the lower the cost, the higher the utility value). Alternatively, an arbitrary function based on these measures can be used to determine the utility value for deploying the VM on a data center.

When evaluating the overall utility value for deploying a set of functions, an aggregate combined utility across the individual utility values for each function can be used, wherein the aggregate utility can be an arbitrary function of the costs of service, the DCS measures of the data centers, and the performance sensitivities of the VMs. An example of such an aggregate utility measure can include the sum or product or other functional form based on the individual utility values for each of the VMs. An aggregate utility measure can be computed per data center, and the combined aggregate measure across the data centers can be used to determine the overall utility associated with a specific partitioning strategy, wherein the partitioning strategy can include replication of VMs across data centers as needed. The partitioning strategies will need to satisfy resource constraints in each data center, such as, for example, processing, storage, bandwidth, and/or energy constraints. The partitioning option with the highest value of the aggregate utility measure can be selected as the partitioning strategy.

In addition, based on the degree of resource utilization in a data center or based on the time of the day of using energy resources in the data center, the costs associated with resource utilization can also vary dynamically. These dependencies can be factored in to refine the utility values dynamically and/or to determine an appropriate distributed partitioning of resources in the system. Incremental refinement of an existing partitioning or incremental addition or deletion of VMs can also be carried out such that only a subset of the functions is remapped across data centers. In such a case, a relative difference in utilities can be computed across partitioning options relative to an existing partitioning strategy to determine the incremental partitioning. The measures utilized to compute utility values can be probabilistic (for example, the cost of service can be probabilistic, or the allocation of a subset of functions can span a probabilistic set of states), in which case an expected utility measure can be computed. In such cases, different criteria can be used such as the relative difference in expected utilities for a remapping, a Laplace criterion that maximizes an expected mean utility across probabilistic states, a maximin strategy across utility values by maximizing the minimum utility (or a minimax strategy if the utility is computed as a loss instead of a gain to minimize the maximum loss), a Savage criterion that applies a minimax strategy to a regret matrix, a Hurwitz criterion that selects a mapping that adopts a conservative strategy between maximum and minimum expected utilities, and/or other alternative strategies. In general, the hierarchical function managers exchange information to determine an appropriate distributed VM partitioning strategy in the hierarchical data center system based on such and/or other optimization techniques.

As used herein, the following abbreviations are used in descriptions of one or more embodiments of the invention: cloud data center (CDC), network function virtual machine (NFVM), a hierarchical function manager (HFM), in-network data center (NDC), service function virtual machine (SFVM), application function virtual machine (AFVM), small cell (SC), user equipment (UE), upper data center (UDC), lower data center (LDC), a very low data center (VLDC), and DCS.

Accordingly, at least one embodiment of the invention includes generating and/or providing DCS-aware hierarchical and distributed function partitioning for network operations with NFVM partitioning across a UDC and an LDC (which can, for example, have multiple levels of hierarchy, as needed). Additionally, at least one embodiment of the invention includes virtualized infrastructure sharing across operators, as well as utilization of one or more HFMs to enable static and/or dynamic VM partitioning based on latency sensitivity, differentiated services offerings, green computing and communications considerations, distributed computing, storage and/or network constraints.

A global HFM can reside entirely in a UDC, receiving constraint information (computing, storage, and/or network constraint information, for example) from different DCs, and partitioning resources, and such a global HFM can provide centralized decisions for data centers in the entire hierarchy. However, such centralized decision-making can be coarse-grained, and it is likely that centralized decision-making would needed to be assisted by local decision-making in each data center using a local HFM in each data center. Thus, a local HFM can be available in each DC for local decision-making, wherein the local HFM utilizes input from a global HFM to take final decisions. Alternatively, each of the HFMs in each data center can operate independently with no centralized decision-making to determine the VMs that each respective data center would support, while taking input from other HFMs about respective allocations. HFMs can also iteratively refine allocations of resources based on the decisions made by other HFMs and based on any global requirements for the entire system. Global requirements for the entire system can be derived, for example, via pre-specified static policies for network system requirements (which can be provided by an operator), and/or can include the dynamic policy requirements such as based on current network loads, the number of the users being served by the network, or anticipated predicted usage based on past utilization of the network.

Further, as described herein, at least one embodiment of the invention includes partitioning and/or reusing LDC/UDC data center resources to allocate fractional resources (when available) for distributed service function partitioning.

Another aspect of the invention includes retaining network function VMs requiring higher DCS support (for example, VMs that handle more latency-sensitive functions related to a radio network controller (RNC), Evolved Node B (ENodeB), Node B (NodeB), a serving general packet radio service (GPRS) support node (SGSN), a mobile management entity (MME), a serving gateway (S-GW), etc.) in an LDC and lifting less latency-sensitive network function VMs (for example, VMs, that handle functions related to a gateway GPRS support node (GGSN), a packet data network gateway (P-GW), etc.) to a lower DCS UDC. Thereafter, one or more embodiments of the invention include deploying differentiated services data centers with optimized network paths in operator networks to support service level agreements (SLAs) with improved and/or enhanced services.

Additionally, yet another aspect of the invention includes placing one of a south-facing function (such as, for example, a function associated with SGSN and the S-GW interacting with the RNC or the ENodeB) in an LDC, and placing a north-facing function (such as, for example, a function associated with SGSN and the S-GW interacting with the GGSN and the P-GW) into a UDC, such that the functions executing in a traditional network node (such as an S-GW or an SGSN) are split between two data centers. An example of a south-facing S-GW function can include the communication of buffered data from an S-GW to a target ENodeB to enable a hand-off from a serving ENodeB to a target ENodeB. An example of a north-facing S-GW function can include a request from the S-GW to a P-GW to allocate an internet protocol (IP) address to a UE or user device.

As such, an example embodiment of the invention includes providing a DCS-aware hierarchical DC architecture, wherein a first UDC that has a lower DCS measure (such as a lower latency sensitivity) is placed higher in the network hierarchy, whereas a second LDC is placed internal to an operator network and lower down in the network hierarchy to meet DCS constraints (such as latency constraints) for network function execution and interaction with user devices. In such an example embodiment, network functions that require higher DCS sensitivity execute in VMs in the second LDC, whereas network functions that have lower DCS measure requirements execute in VMs in the first UDC. For instance, in a third generation partnership project (3GPP)/LTE network, network functions relating to the RNC, ENodeB, NodeB, SGSN, MME, and the S-GW can be placed in the second LDC, whereas functions relating to nodes that are higher up in the network hierarchy, such as the GGSN or P-GW, can be placed in the first UDC.

Such an example embodiment of the invention can also include further partitioning of network function VMs in the network. For example, functions that require very high sensitivity support with respect to DCS measures such as functions that are related to the NodeB or the ENodeB or the RNC can be placed in a third VLDC that is placed further lower down in the network hierarchy (closer to users and/or devices), whereas functions that relate to the SGSN, the MME, and the S-GW can continue to be placed in the second LDC. For example, highly latency sensitive functions can execute in hardware in traditional hardware appliances to serve lower-level NodeB/RNC/ENodeB functions (such as the physical (PHY) layer, the media access control (MAC) layer, and/or the radio link control (RLC) layer), whereas upper layers such as the PDCP layer, IP-packet fragmentation or defragmentation, or programmable connectivity to SGSNs or S-GWs (hardware appliances or virtual software appliances) can be enabled via software appliance implementations using RNC VMs or ENodeB VMs in the third VLDC (or in the second LDC when a third VLDC is not used in the hierarchy.) Additional optimizations can include, for example, retaining the south-facing network functions in the radio access network (RAN) for the ENodeB and the RNC in the third DC, whereas north-facing functions that relate to the interactions of the RNC with the SGSN, or the ENodeB with the S-GW, can be moved up to the second LDC.

Similarly, south-facing functions in the core network for the SGSN and the S-GW that relate to the SGSN interacting with the RNC or the S-GW interacting with the ENodeB can be retained in the second LDC, whereas the north-facing SGSN and S-GW functions for interactions with the GGSN and the P-GW, respectively, can be moved into the first UDC in the cloud. Accordingly, the network functions for a physical network node such as the SGSN or the S-GW can be partitioned into higher and lower DCS-measure-sensitive virtual network functions such that the virtual network functions can be subsequently relocated in DCs in the network hierarchy as desired, while meeting performance levels (for example, in connection with latency, bandwidth, network, computing, and/or storage availability) for an operator service.

An alternative example can include moving the southbound SGSN and S-GW functions into the third VLDC, which can contain all of the functions for the RNC, NodeB and ENodeB, whereas the northbound functions for the SGSN and S-GW can be retained in the second LDC. The first UDC can be placed in a cloud or can be placed within the operator's network, higher up in the network hierarchy. One or more embodiments of the invention can also include further partitioning of network functions in the first UDC, such as, for example, moving the least sensitive network function VMs into the cloud, while keeping other more sensitive network functions VMs in a DC in the operator's network. Further, because these network functions will be available as VMs, it is possible that, for some users, the upper-level network functions can be positioned lower down in the hierarchy, such as in the second LDC or the third VLDC, to offer differentiated services for such users.

An alternative example can include hierarchical collapsing of functions (such as collapsing the set of network functions that relate to an overall service function for 3G or 4G cellular services) into an LDC, or between a VLDC and an LDC, to enable application functions to execute in the LDC, or to deliver improved performance. Collapsing functions can be performed to reduce inter-function communications costs, to improve application performance associated with applications that are supported over the network, and/or to provide differentiated services for a given set of users that have a higher quality-of-service requirement or cost-of-service requirement compared to another set of users. Quality-of-service requirements and/or performance requirements can pertain, for example, to latency, bandwidth, jitter, and delay tolerance associated with application flows. Alternatively functions can be hierarchically split between an LDC and a UDC to enable applications to execute in a UDC. Examples of such application functions can include delivery of content stored at an LDC or a UDC, supporting a mobile gaming application or an augmented reality application at an LDC or a UDC, supporting social networking of users using a social networking application function connected to an LDC or a UDC, and/or supporting interne access via an LDC or a UDC. Network functions such as firewalls, load balancers or security/authentication/usage-monitoring functions can be replicated across these data centers as needed. The supported applications can be placed in one of the data centers in the hierarchy or can be replicated across the data centers. Depending on the needs of the users and/or the service level agreements associated with the service for such applications, different users can be mapped to application functions residing at different locations in the data center hierarchy.

As detailed herein, the placement of functions can be managed by an HFM across the data centers. The HFM functionality can be implemented in a centralized manner with a central HFM coordinating placement, or in a distributed manner with HFMs distributed across the data centers. Alternatively, the functions that are placed by an HFM can include network functions, a set of network functions comprising a network service provided by an operator, a function, a set of functions that enable an application, and/or a service to the provided to one or more users or user devices. The data center hierarchy can include a combination of a large data center in the cloud connected to one or more mini-data centers higher up in the network, wherein each mini-data center can be connected to one or more micro-data centers lower down in the network. Additional larger or smaller data centers can exist in the hierarchy, such as a very large data center connected to one or more large data centers, and/or one or more pico-data centers connected with a micro-data center.

Additionally, HFM capabilities can exist in each data center. An HFM higher up in the data center hierarchy can coordinate a coarse placement and execution of functions across the various data centers communicating with HFMs in other data centers. Such a coarse placement can include determination of the type of functions that need to execute in each data center, the number of replicated VMs for such functions, and a time-varying allocation of functions in the hierarchy over a time duration such as an hour, a day, or a week. Such a coarse placement of functions can be enabled by a hierarchical data center policy manager (HDCPM) that provides function placement input to an HFM in a data center to help with coarse placement of functions in the hierarchy. Functions can be replicated across data centers if needed, and depending on the needs of a specific application, service or network function, the appropriate data center location for the execution of a function can be chosen. In addition, each HFM in a data center can take fine-grain dynamic decisions on the number of resources being allocated based on the actual usage of resources in the data center, wherein such decisions can be taken at smaller time scales (such as over seconds or minutes, or over an hour or a few hours) relative to the time scales for coarse placement decision-making in the system. An HDCPM can also provide inputs directly to the HFM in a specific data center to assist the HFM in decision-making within the data center. The actual form of the DCS measure that is used to determine function portioning, replication, and placement can dynamically vary, wherein such dynamic variation of the measure can be programmed into the HFM, or it can be specified dynamically (for example, via an input provided to the HDCPM or the HFM by an external entity such as a user). In addition, as a data center runs out of resources or reaches a stage wherein additional resource allocation becomes expensive due to very limited resource availability, then the HFM in the data center can trigger a request to an HFM in a data center that is higher or lower in hierarchy to allocate resources. A resource allocation request to a higher data center can be sent if the higher data center can meet the constraints required for the network, service or application functions for which resources are requested. A request to a lower data center can be sent based on resource availability in the data center, and if the costs in the lower data center are not significantly high.

With regard to infrastructure sharing across operators, an HFM can decide what fraction of resources to allocate for each operator within a data center or across data centers. In addition, some function or set of functions may be placed in a data center with a higher DCS measure for an operator that may be willing to pay more for higher performance resources, whereas the same function or set of functions may be placed in a data center with a lower DCS measure for an operator that may be willing to pay less for the network resources. In addition, for the same operator supporting different types of users, some function or set of functions may be placed in a data center with a higher DCS measure for a user or set of users that have higher service requirements, whereas the same function or set of functions may be placed in a data center with a lower DCS measure for users that may have lower service requirements from the same operator.

A hierarchical analytics engine (HAE) can reside in each data center, wherein the HAE can monitor and analyze the actual resource utilization in each data center to predict future resource requirements in the data center. Each HAE can carry out decisions based on its own internal predictions (via received inputs from other HAEs or a centralized HAE). A local HAE can estimate utilization statistics $U_{k,f}(T)$ over a given duration of time T for a function $f$ executed on a data center k, which can be used to estimate the average number of VM resources $N_{k,f}(T)=U_{k,f}(T)/\mu_{k,f}$. Here, $\mu_{k,f}$ reflects the capacity associated with the maximum utilization of a function $f$ at data center k (for example, this can relate to the maximum number of mobile users supported by the network function $f$ at data center k, or the maximum number of flows of a certain rate for an application, such as video streaming of a cached video) that can be supported by a single VM that supports a particular function $f$ at a data center k, wherein $N_{k,f}(T)$ is the number of VM resources required in a data center k based on the utilization $U_{k,f}(T)$ for the function $f$. Global information across a network of data centers can be gathered to infer global statistics $G_f(T)$ for a function $f$, given by $$G_f(T) = \sum_k U_{k,f}(T).$$

The fractional usage $\lambda_{k,f}(T)$ at a data center k relative to the global usage can be estimated by using the relationship $$\lambda_{k,f}(T) = \frac{U_{k,f}(T)}{G_f(T)}.$$

Subsequently, based on a global estimate of usage for a function for a new time interval of duration T given by $G_{f,ext}(T)$ (wherein such estimation can be based on past observed usage, policy requirements, dynamic requirements, or based on a dynamic partitioning based on a function of DCS measures), the allocation of usage of a function $f$ for a data center k can be based on the global estimate given by $\lambda_{k,f}(T) G_{f,ext}(T)$, and the number of VMs required to support the function $f$ on data center k can be given by $N_{k,f,global}(T)=\lambda_{k,f}(T) G_{f,ext}(T)/\mu_{k,f}$. If the data center k has its own internal estimate of resources $N_{k,f,local}(T)$, then a weighted combination of internal and globally suggested allocation of VM resources to support a function $f$ at a data center k can be given by $N_{k,f}(T)=\beta_{local}N_{k,f,local}(T)+\beta_{global}N_{k,f,global}(T)$ wherein $\beta_{local}+\beta_{global}=1$, and wherein the weights $\beta_{local}$ and $\beta_{global}$ can vary dynamically and can be dependent on externally supplied inputs into the system or based on policies programmed into the system or varied dynamically based on internal decision-making.

If needed, the VM resources estimated can be overprovisioned by a small factor c, such that the allocation of VM resources to support a function $f$ for a given data center k is given by $N_{k,f}(T) (1+\epsilon)$. An overall partitioning of functions across data centers can be performed, with possible replication of functions as needed. Such partitioning can take into account any flexibility in placing functions that policies may specify, such that the functions and corresponding VMs can be relocated as needed. Relocation of a VM can include a slow phasing-out of a VM instance to support a function or a set of functions at a specific data center. Relocation can also include not allocating additional users and/or devices to the data center supported by the VM, and shutting down the VM instance as the sessions associated with the supported users and/or devices by the VM instance terminate. When termination of all sessions associated with users and/or devices within a certain time window is not possible, then the remaining users and/or device sessions can be relocated to other VM instances in other data centers that support the same function or set of functions that were being supported by a specific data center, to allow that specific data center to shut down. Such a shutdown can be required based on a brown-out policy that can be imposed on the overall system. In general, an HFM can include, among other components, an HAE, an HDCPM, a hierarchical resource manager (HRM), and a hierarchical I/O manager (HIOM). The HRM consolidates the mapping of resources based on learned and/or predicted values of resources, policy inputs, and static and/or dynamic inputs on resource requirements or static and/or dynamic inputs on an overall DCS measure function that needs to be used to determine function placement in the data center hierarchy. The HIOM manages inputs and outputs received by the HFM from different sources of inputs, including external user input or network operator inputs, application service provider inputs, inputs from within the data center hierarchy from other HFMs, and/or outputs of metrics or relevant information from the HFM to different entities (other HFMs, external users, network operators, application service providers, etc.) as needed. The HIOM can also validate the source of the inputs being provided such that only authorized inputs are allowed to be processed in the HFM (such as validating the energy pricing value from a utility company, or validating a change in the data center operation policy for an operator). The HFMs enable distributed virtual machines interacting across these hierarchical DCS-measure-aware data centers to support required network, service and/or application functions in the overall system.

FIG. 1A is a diagram illustrating DCS-aware hierarchical network function data centers, according to an embodiment of the present invention. By way of illustration, FIG. 1A depicts a DCS Level 3 data center (L3DC) 102, a Level 2 data center (L2DC) layer 104, and a Level 1 data center (L1DC) layer 106, as well as a network access device layer 108 (such devices can include, for instance, Wi-Fi access points, base stations, and/or enterprise routers), and a user devices layer 110. User devices (in layer 110) can access multiple networks that might be available to them. HFMs 112, 114, and 116 manage the hierarchical allocation of data center resources in the data center hierarchy (that is, within and/or across L3DC 102, L2DC layer 104 and L1DC layer 106).

Figure 1B:
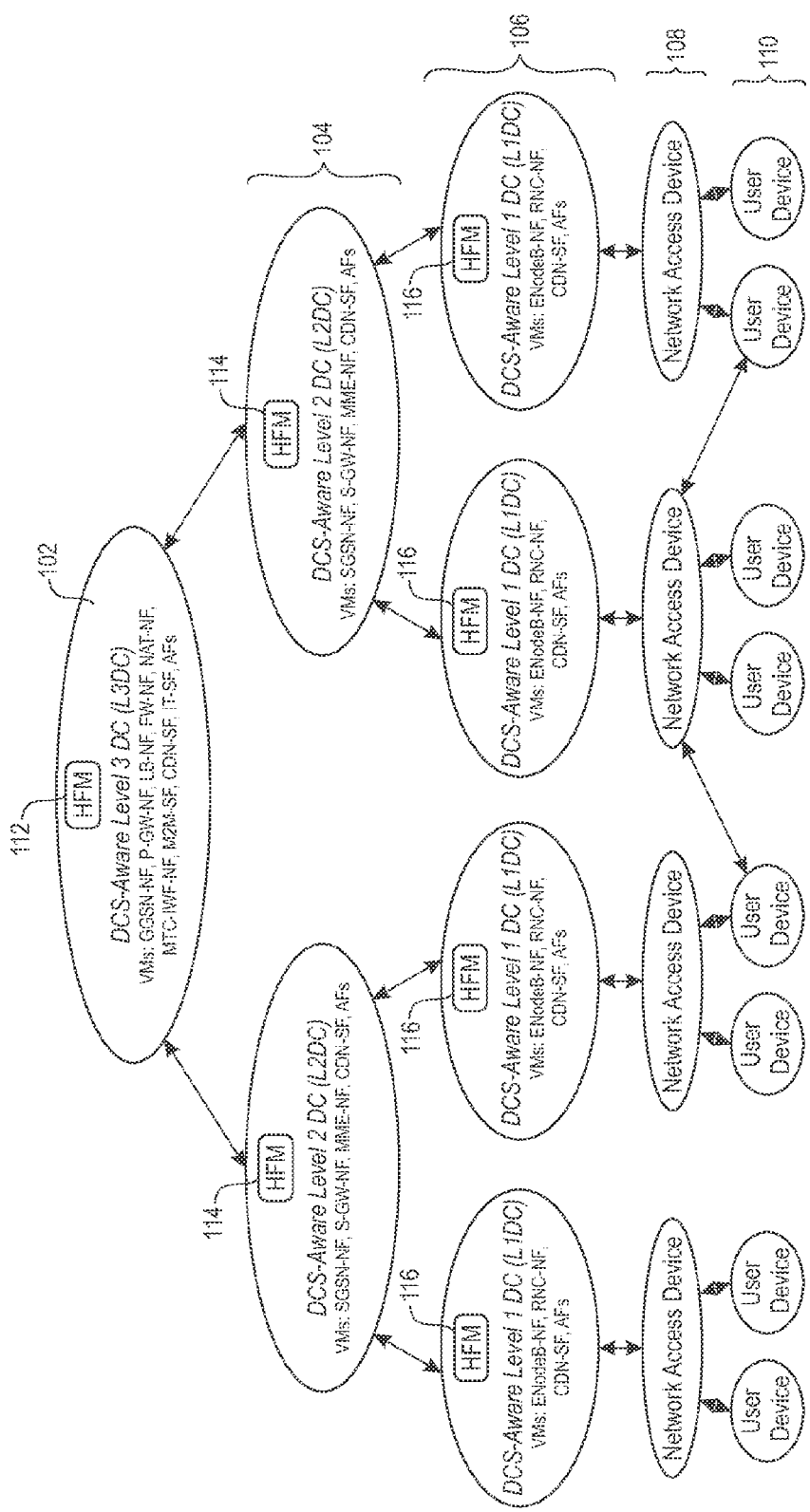

As an exemplary variant of the system of FIG. 1A, FIG. 1B depicts an example of hierarchical partitioning of resources for an LTE/universal mobile telecommunications system (UMTS) system. As illustrated, the example embodiment of the invention depicted in FIG. 1B includes distributed VM placement for network functions. The L3DC 102 supports VMs that execute network functions (NFs) related to a UMTS GGSN, an LTE P-GW, a load balancing, network address translation (NAT), firewall network functions, machine type communications internetworking function (MTC-IWF) to support machine-type or M2M communications, an M2M service function to enable M2M services via the MTC-IWF function, a content delivery network (CDN), a service function (SF), an inter-operator tunneling service function (IT-SF) or application functions (AFs) including an M2M application, an email application, a social networking application, or an audio/video application, and/or an augmented reality application.

The L2DC layer 104 in FIG. 1B can support network functions that are more performance sensitive, such as latency sensitive functions associated with core network functions such as an SGSN, an S-GW, or an MME node, along with other service and application functions. The L1DC layer 106 in FIG. 1B can support functions that are even more latency sensitive including access network functions such as that of an UMTS RNC, an LTE ENodeB, and/or a subset of software/programmable functions (such as a programmable function to establish dynamic connectivity with an S-GW VM, an SGSN-VM, or a PDP layer in the RNC) associated with such nodes. The L1DC layer 106 can support additional service and application functions as well. A hardware appliance in network access device layer 108, including, for instance, a UMTS NodeB base station, an ENodeB, or a subset of functions associated with an ENodeB such as physical and MAC layer functions can comprise the network access devices depicted in layer 108 in FIG. 1B.

Figure 1C:
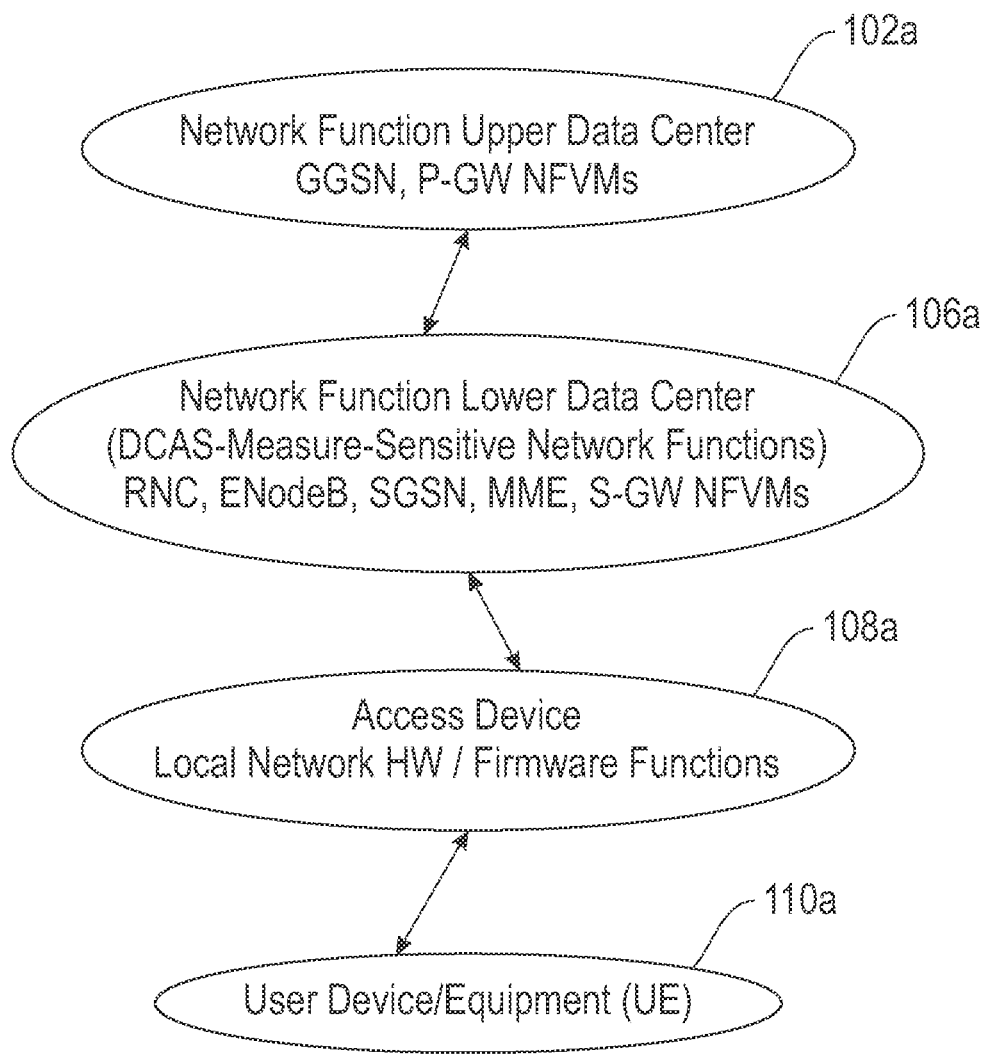

FIG. 1C is a further simplified exemplary variant of the system of FIG. 1A, which shows a network function upper (or higher) data center UDC 102a (which includes GGSN and P-GW functions), a software (SW) network function lower DC 106a (which includes DCS-measure-sensitive network functions as well as RNC, ENodeB, SGSN, MME, and S-GW), an access device 108a, which includes local network hardware (HW) and/or firmware functions, and a user device or UE 110a.

Figure 1D:
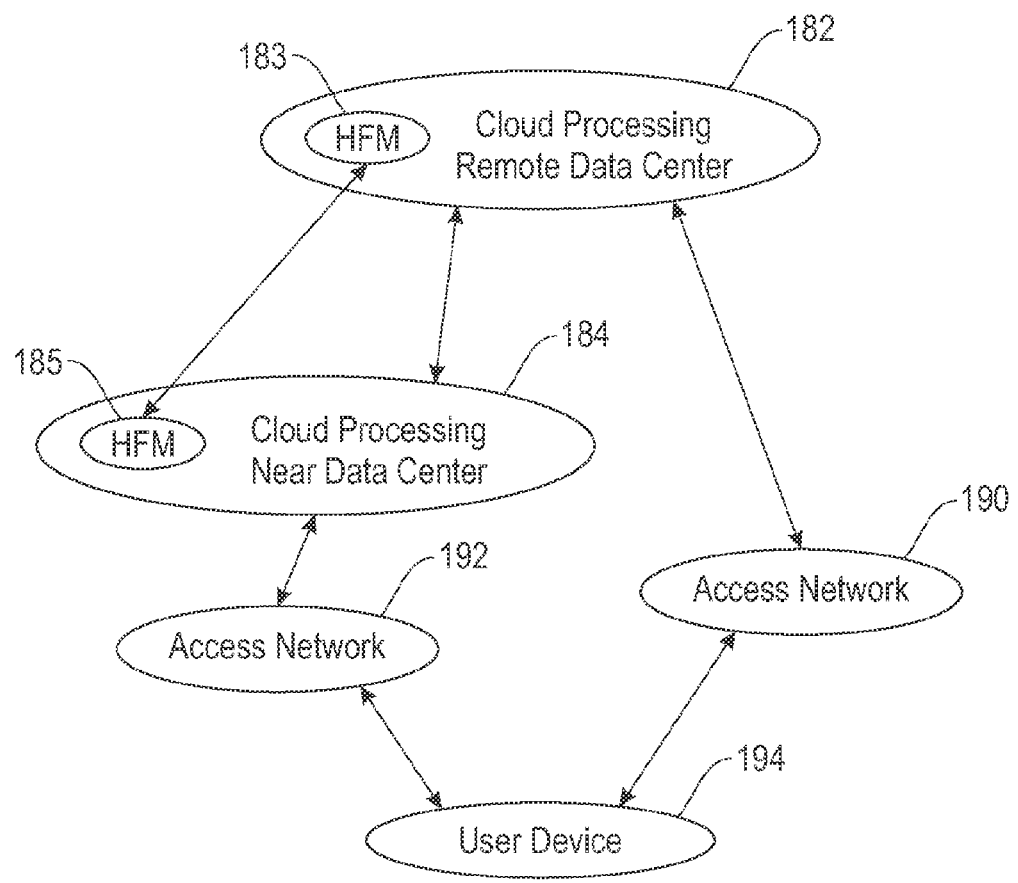

FIG. 1D is another exemplary variant of the system FIG. 1A, which shows two cloud processing data centers, one remote data center 182, and one near data center 184, connected via access networks 190 and 192, respectively, to a user device 194. Here, access networks 190 and 192 can be different networks, or these access networks can be part of the same access network sharing network resources. Data center 184 can have a different DCS measure (a higher value, for example) than data center 182, relative to the ability of the two data centers to serve user device 194.

With respect to the user device 194, a relative hierarchy of data centers is imposed based on the abilities of the data centers 182 and 184 to serve the user device, based on their DCS measures relative to the user device 194. In such architecture, VMs related to a cloud processing platform, such as by providing interactive cloud development services, latency-critical services such as a video content delivery service or a voice over IP (VoIP) service, or a social networking service for nearby users can be delivered by the near data center 184, whereas other cloud services such as a web query service, an email application, or a social networking service that includes remote users can be served by the remote data center 182. HFMs 183 and 185 in data centers 182 and 184, respectively, interact with each other to determine the cloud services to host in the respective data centers. The partitioning of such services can vary across different devices (such as device 194), wherein a user device that requires higher quality of service guarantees may have additional cloud services supported by the cloud processing near data center 184.

Figure 1E:
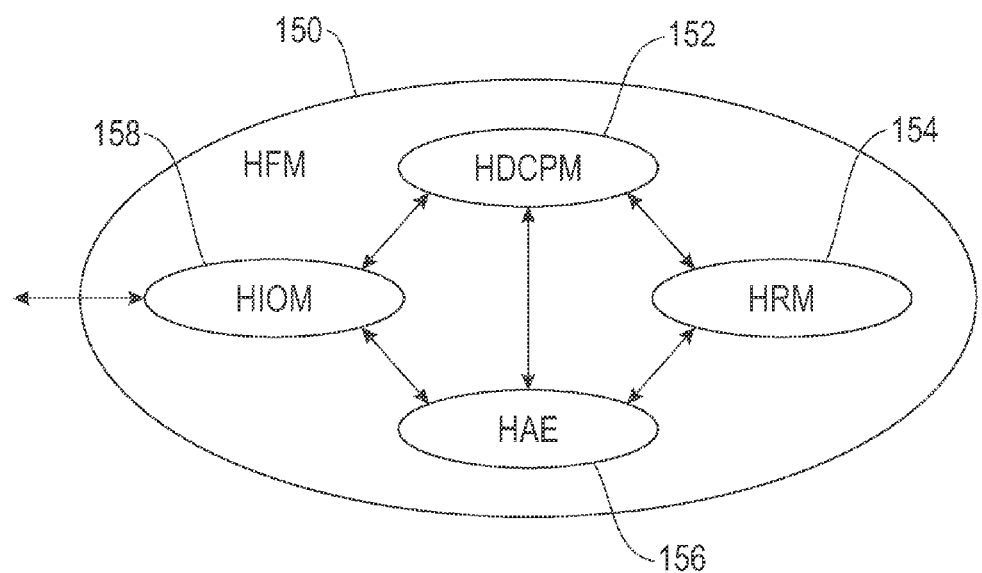

FIG. 1E depicts the typical components within an HFM module 150 in a data center, including an HDCPM component 152, an HRM component 154, an HAE component 156, and an HIOM component 158. The HIOM component 158 manages interactions with other HFMs and other external entities via actions such as obtaining a policy requirements input from an operator. The HDCPM component 152 gathers policies that the data center needs to obey such as a time dependent black-out or brown-out policy, policies that relate to the utilization of virtual machines such as the number of VMs that can remain idle or under-utilized below a certain threshold, or the functions that are allowed to be supported in the data center. Policy violations can be tolerated for short durations below a threshold for allowing policy violation such that new resource requirements may eliminate a temporary policy violation. The HAE component 156 learns and predicts resource utilization for the functions that need to be supported by the data center. The HRM component 154 determines the resources that need to be utilized in the data center based on inputs from other components in the HFM 150 to support the functions that need to be executed in the data center. The HFM 150 interacts with other HFM components in the data center hierarchy to determine which resources are to be supported with partitioning, replication, or collapsing of functions as needed in the data center hierarchy. The HFM 150 can trigger resource allocation requests to other HFMs in the data center hierarchy such as, for example, if the data center is reaching a critical threshold on resource availability, or if a dynamic policy requires migration of functions to another data center. Function migration can be performed such that a function can be moved completely from one data center to another data center carrying the function state associated with the applications, services and users being supported by the function. However, such explicit migration can be expensive. Therefore, alternatively, function migration can be accomplished such that a function is slowly phased out of a data center as its utilization diminishes such that no new users or applications or service flows are allocated to that function. In addition, as a function is phased out, when its utilization falls below a certain threshold such that the cost of migration falls below a certain threshold, then a function can be completely migrated to another data center as desired.

Figure 2:
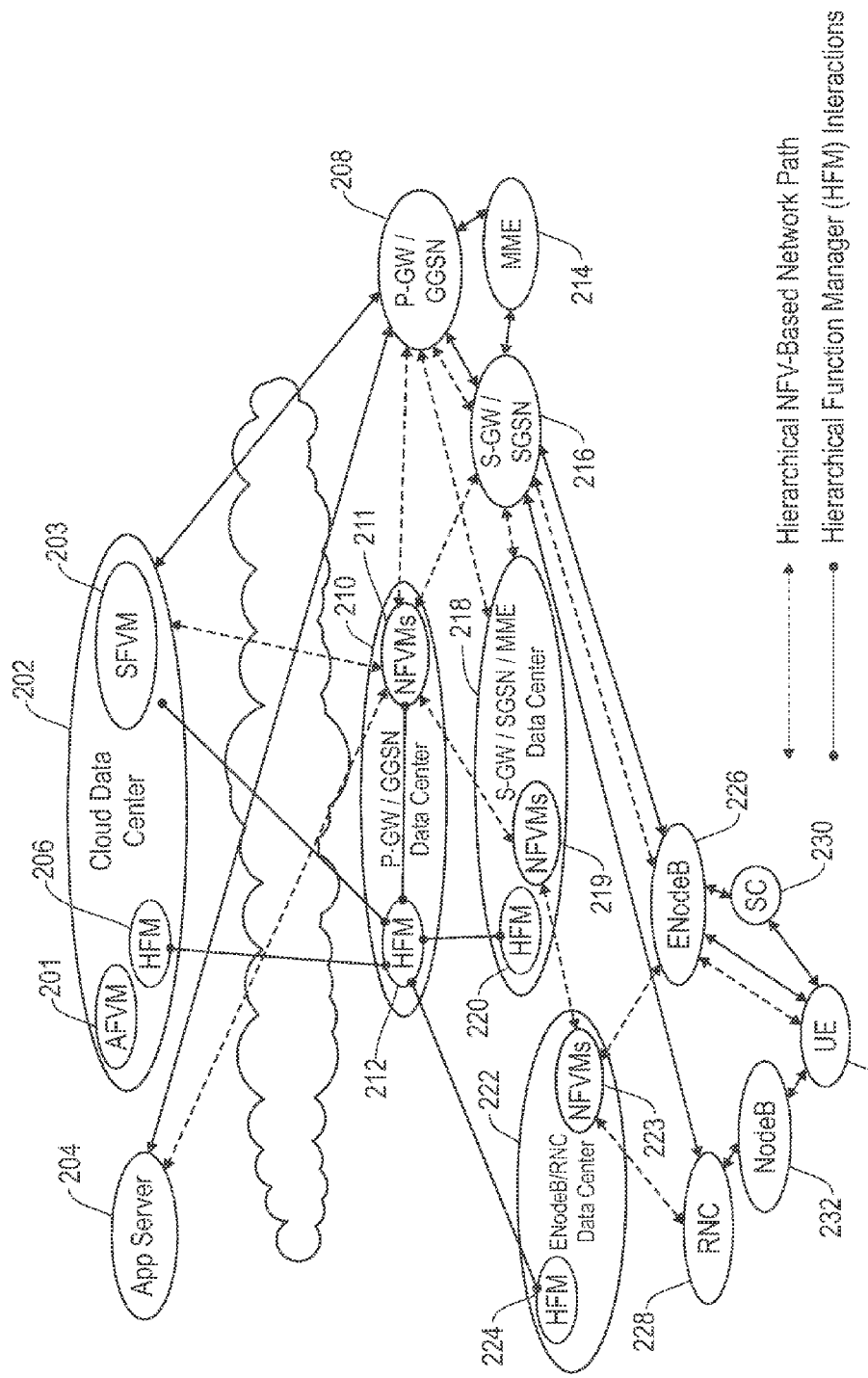
FIG. 2 is a diagram illustrating a hierarchical DCS-aware system, according to an example embodiment of the present invention.

FIG. 2 is a diagram illustrating a hierarchical DCS-aware system with cloud connectivity, according to an example embodiment of the present invention. By way of illustration, FIG. 2 depicts a CDC 202, which includes SFVM 203. Additionally FIG. 2 depicts the cloud 104, application (app) server 204, an HFM 206, a P-GW/GGSN 208, and a P-GW/GGSN DC 210, which includes NFVMs 211 and HFM 212. Also, FIG. 2 depicts MME 214, an S-GW/SGSN 216, and an S-GW/SGSN/MME DC 218, which includes NFVMs 219 and HFM 220. Further, FIG. 2 depicts ENodeB 226, SC 230, UE 110, NodeB 232, an RNC 228, and an ENodeB/RNC DC 222, which includes NFVM 223 and HFM 224. Also, in FIG. 2, the dashed arrows represent hierarchical NFV-based network paths.

Also in FIG. 2, connectivity is shown between the VMs in data centers representing software appliances executing functions in hardware appliances, with connectivity between software and hardware appliances enabling backward compatibility to existing networks with hardware appliances, and allowing the ability to use software appliances as needed. In the longer term, hardware appliances can potentially be phased-out so that the interconnected data centers with VMs are all that remain. However, as networks transition, the networks can support both traditional hardware appliances along with software appliances executing in VMs in data centers, wherein these data centers are arranged in a DCS-aware hierarchy.

Figure 3:
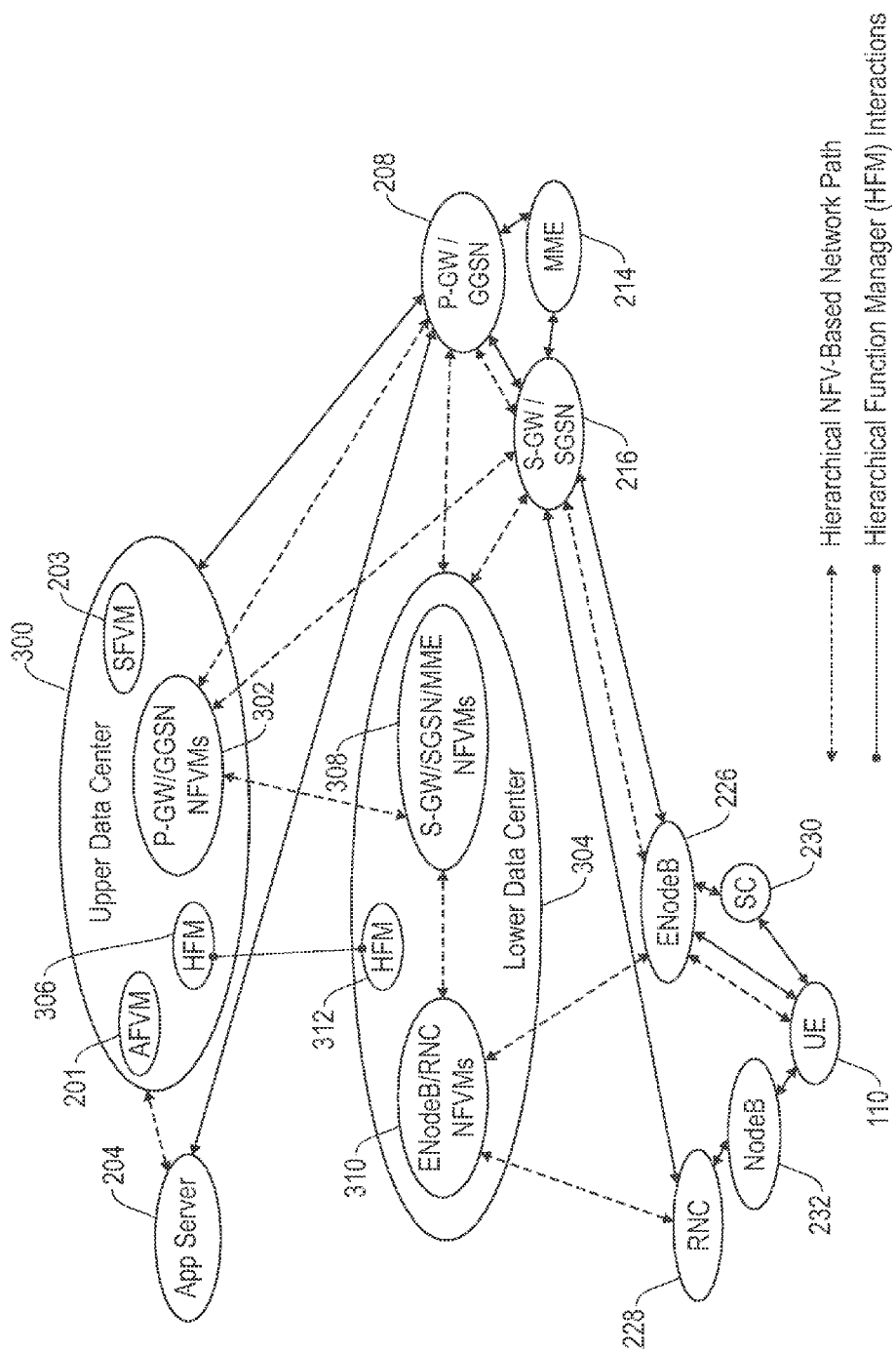
FIG. 3 is a diagram illustrating a hierarchical DCS-aware system, according to an example embodiment of the present invention.

FIG. 3 is a diagram illustrating a hierarchical DCS-aware system, according to an example embodiment of the present invention. By way of illustration, FIG. 3 depicts UDC 300, which includes SFVM 203 and P-GW/GGSN NFVM 302. Additionally FIG. 3 depicts the app server 204, HFM 306, P-GW/GGSN 208, MME 214, S-GW/SGSN 216, and a DCS-measure-aware lower DC 304, which includes HFM 312, SGSN/S-GW NFVM 308 and ENodeB/RNC NFVM 310. Further, FIG. 3 depicts ENodeB 226, SC 230, UE 110, NodeB 232, and an RNC 228. Also, in FIG. 3, the dashed arrows represent hierarchical NFV-based network paths. Relative to FIG. 2, FIG. 3 depicts collapsing of applications, services and upper data center network functions into a common data center, and collapsing of two lower data centers into a single lower data center.

Figure 4:
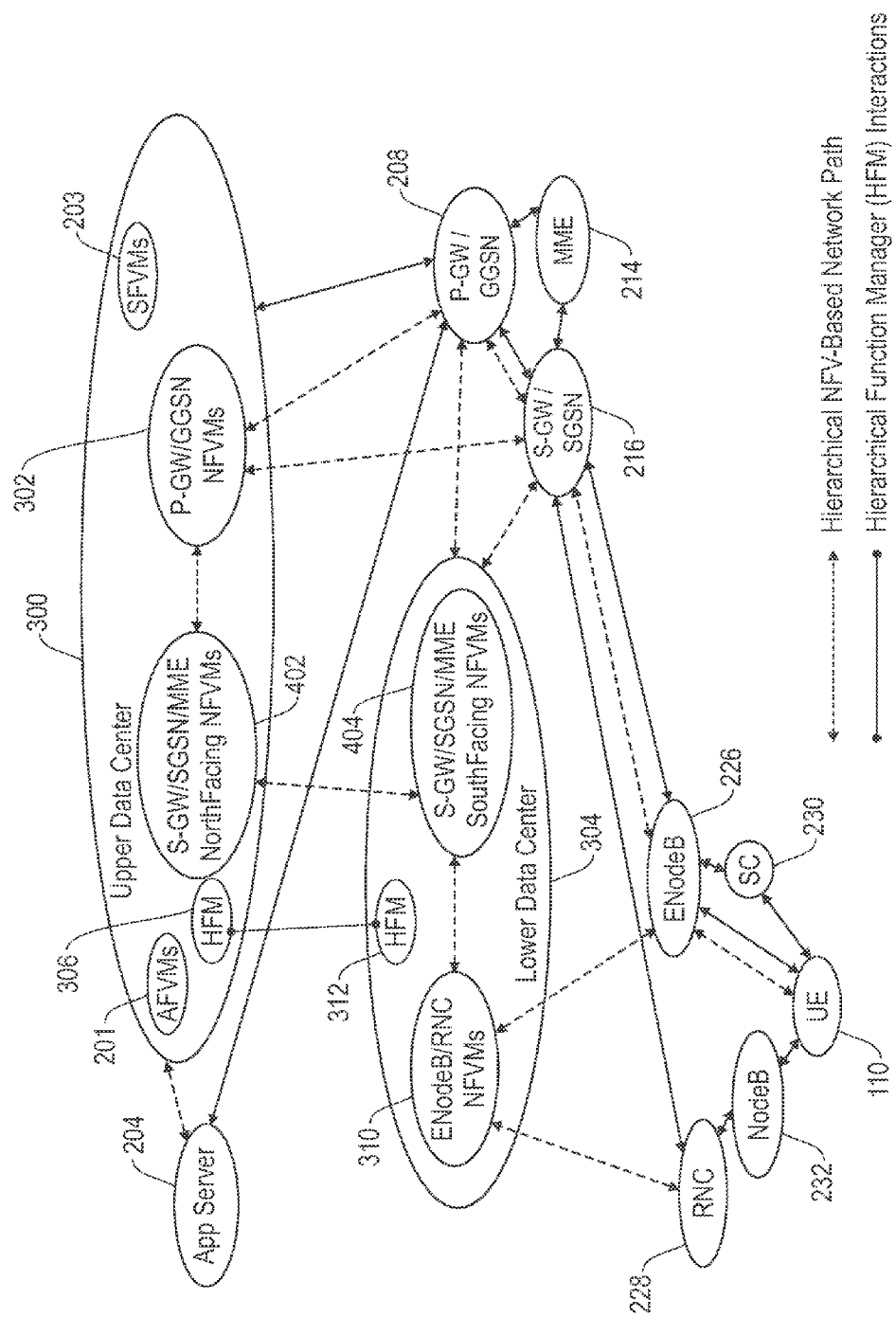
FIG. 4 is a diagram illustrating a hierarchical DCS-aware system, according to an example embodiment of the present invention.

FIG. 4 is a diagram illustrating a hierarchical DCS-aware system, according to an example embodiment of the present invention. By way of illustration, FIG. 4 depicts UDC 300, which includes SFVM 203, and P-GW/GGSN NFVM 302, and an SGSN/S-GW NFVM upper layer 402 (which is P-GW/GGSN facing), and HFM 306. Additionally FIG. 4 depicts app server 204, HFM 306, P-GW/GGSN 208, MME 214, S-GW/SGSN 216, and DCS-measure-aware lower DC 304, which includes an SGSN/S-GW NFVM lower layer 404 (which is RAN facing), ENodeB/RNC NFVM 308, and HFM 312. Further, FIG. 4 depicts ENodeB 226, SC 230, UE 110, NodeB 232, and an RNC 228. Also, in FIG. 4, the dashed arrows represent hierarchical NFV-based network paths. Accordingly, as illustrated in the example embodiment of FIG. 4, S-GW/SGSN functions have been partitioned into an upper layer 402 and a lower layer 404.

An example of a south-facing S-GW function can include the communication of buffered data from an S-GW to a target ENodeB to enable a hand-off from a serving ENodeB to a target ENodeB. An example of a north-facing S-GW function can include a request from the S-GW to a P-GW to allocate an IP address to a UE. FIG. 4 depicts splitting the overall functions associated with an S-GW or an SGSN across two data centers with the higher DCS-measure-sensitive functions moving to a lower data center.

Figure 5A:
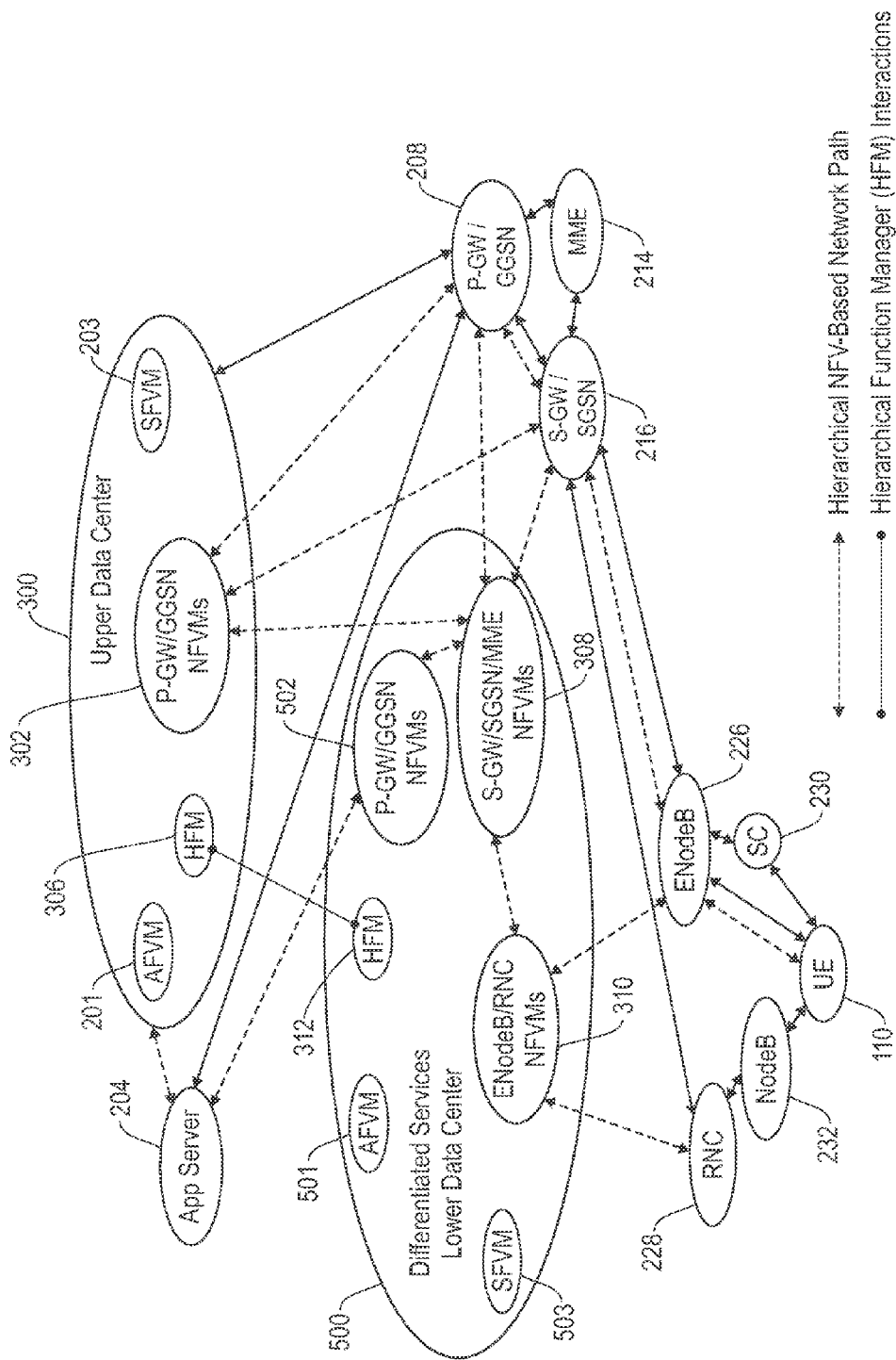
FIG. 5A is a diagram illustrating a hierarchical DCS-aware system, according to an example embodiment of the present invention.

FIG. 5A is a diagram illustrating a hierarchical DCS-aware system, according to an example embodiment of the present invention. By way of illustration, FIG. 5A depicts a differentiated services DC 500, which includes AFVMs 501, SFVMs 503, P-GW/GGSN NFVM 502, SGSN/S-GW NFVM 306, ENodeB/RNC NFVM 308, and HFM 508. Additionally, FIG. 5A depicts app server 204, HFM 306, P-GW/GGSN NFVM 302, P-GW/GGSN 208, MME 214, S-GW/SGSN 216, and DCS-measure-sensitive NFVMs DC 304, which includes SGSN/S-GW NFVM 306 and ENodeB/RNC NFVM 308. Further, FIG. 5A depicts ENodeB 226, SC 230, UE 110, NodeB 232, and an RNC 228. Also, in FIG. 5A, the dashed arrows represent hierarchical NFV-based network paths. Accordingly, as illustrated in the example embodiment of FIG. 5A, differentiated services functions can all be hosted at the same DC or at different DCs in the operator's network. Also, at least one embodiment of the invention includes providing an option to utilize NFVMs in either a lower data center or upper data center. Therefore, users, devices, service flows, or application flows requiring higher DCS sensitivity (such as higher latency sensitivity) can choose to utilize NFVMs in the lower data center.

Also, at least one alternative embodiment of the aspect of the invention depicted in FIG. 5A includes collapsing the two data centers (502 and 308) into one data center, wherein SFVM, P-GW VM, S-GW-VM, and ENodeB VM are all in the one data center, which can be referred to as a differentiated services data center. Such a collapsed infrastructure can directly serve users at the edge (for example, communities of users at remote locations that have limited or poor connectivity) by providing support for applications and services directly at the edge. Such a collapsed infrastructure can also help the overall infrastructure for other users as well, such that such users can be served with a better quality of service (QoS) or quality of experience (QoE). Examples of services that can be rendered at the edge can include cached content delivery, support for augmented reality applications, or networked gaming applications. The amount of usage of the network, such as phone calls made or data consumed, can be tracked locally to assess the costs for the usage of the services. In addition, content that can be reused by multiple users, such as educational lectures and videos in a remote location, can be locally accessed by collapsing the network functions (enabling collapsed network function virtualization) into such a differentiated services data center.

FIG. 5A also illustrates differentiated services, according to an embodiment of the present invention. By way of illustration, FIG. 5A depicts a DCS-measure-aware network function upper data center UDC 300 (which includes GGSN and P-GW VM functions), the cloud 104, and a software network function LDC 702 which includes higher DCS-measure-dependent network functions such as VMs associated with RNC, ENodeB, SGSN, MME, S-GW functions, and a differentiated services GGSN/P-GW. FIG. 5A also depicts local network hardware and/or firmware functions 108, and UE 110. In such an example embodiment of the invention, subscribers (such as enterprise customers) can be charged a subscription by relocating UDC VMs to an LDC, while other customers can continue to use the UDC.

Figure 5B:
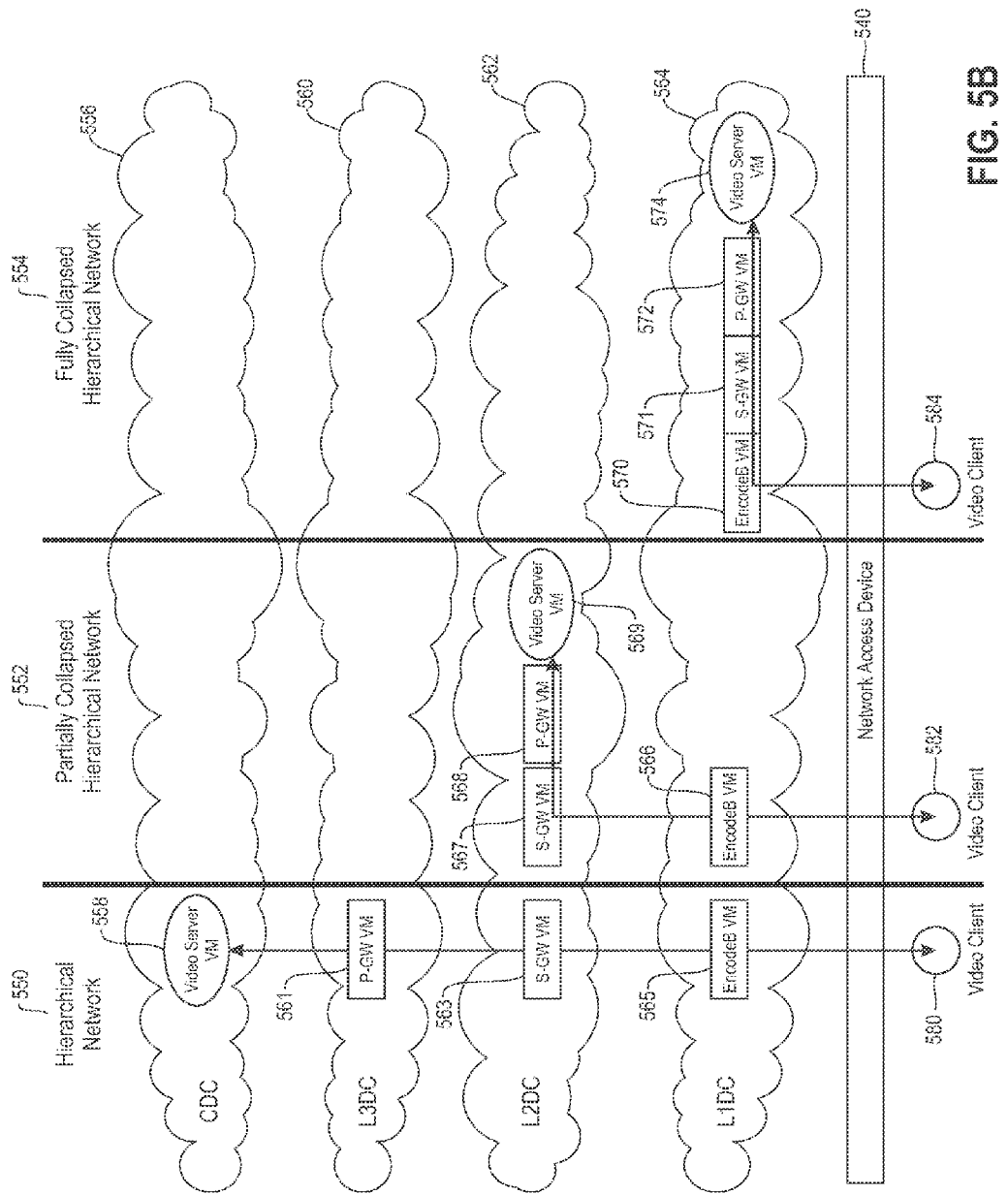
FIG. 5B is a diagram illustrating hierarchical function virtualization, according to an example embodiment of the present invention.

FIG. 5B is a diagram illustrating hierarchical network function virtualization, according to an example embodiment of the present invention. By way of illustration of a video application flow in an LTE user plane utilizing a video client, the ENodeB, S-GW, and P-GW functions in the LTE user plane, and a video server, FIG. 5B depicts a context of a hierarchical network 550 (which includes a video server 558 operating in a cloud data center 556, and video client 580 on a user device), a partially collapsed hierarchical network context 552 (which includes video client 582) encompassing using data center hierarchy to host services, and a fully collapsed hierarchical network context 554 (which includes video client 584) encompassing hosting services close to the edge to improve latency and performance. The access to the LTE network is accomplished via network access device 540, which can include antennae and physical layer radio functions, and MAC protocol functions to enable access to the LTE network.

Additionally, FIG. 5B depicts a level 3 data center 560, which includes a P-GW component 561. Also, a level 2 data center 562 includes S-GW components 563 and 567, as well as a P-GW component 568 and a video server 569. Further, a level 1 data center 564 includes ENodeB components 565, 566 and 570 (wherein the ENodeB VM components can include upper layer software functions in the ENodeB to complement the capabilities of the Network Access Device 540), an S-GW component 571, a P-GW component 572 and a video server 574.

FIG. 5B illustrates progressive hierarchical collapsing of functions from upper data centers to lower data centers to improve the quality of experience of users with respect to applications and services being provided. Hierarchical collapsing of functions enables completion of the entire network function protocol stack functions to quickly enable support for applications and services that ride on top of the protocol stack to serve user devices. The access to the components in the collapsed data center or computational node can be provided through licensed or unlicensed technologies such as licensed LTE or unlicensed LTE.

It is to be appreciated by one skilled art that the context illustrated in FIG. 5B (that is, a video context) is merely one example implementation of an embodiment of the invention, and that additional implementations can be encompassed by one or more embodiments of the invention.

FIG. 5C illustrates the progressive collapsing of functions with the utilization of an application proxy service function VM 531, 532, or 533, which is placed in association with a packet gateway in a network (such as a P-GW in LTE in a 4G network, or a GGSN in a 3G network, or a gateway node for IT service provider). The proxy VM can function on behalf of applications running on a client device, or can serve as a proxy for the services delivered by a server application in the cloud. For instance, the proxy VM can talk to the P-GW or the GGSN to extract information from the network, information such as the IP address of one or more user devices, location of the one or more user devices, and/or identification of applications that are running on the devices that can be supported by the proxy VM. The proxy VM can also maintain network-level connection information and network-level location information of user devices in the network to expose the devices to higher layers. The VM proxy can work with other software stacks in the network, such as firewalls, to tune policies of timers and/or filtering rules for different applications at higher layers. At higher layers, this information can be used by applications such as a push notification server 534 and/or a content application server 535. For instance, the proxy VM can maintain low overhead (keep-alive once in 30 minutes, for example) network connections to mobile phones to reduce frequency of keep-alive messages (instead of keep-alive once per minute, for example), and hence reduce signaling load and battery consumption. The proxy VM can also aggregate application data from different server applications in the cloud intended to be received by a specific device (such as, for example, 580) and deliver the data to the device as an aggregate message, wherein the device can subsequently distribute the data to the respective applications running on the device. Alternatively, the device can aggregate data across applications to be transmitted by the device, and deliver the aggregated data to the proxy VM, such that the proxy VM can distribute the data to the respective server applications in the cloud that support the device. Communication of aggregate messages can help reduce the number of accesses by a device on a network by delivering a bundled or aggregate message over the network. The proxy VM can also execute functions on behalf of cloud server applications by receiving data, such as content relevant to a device, and subsequently delivering the data to the device. As another example, the VM proxy can maintain location-specific content such as videos, and depending on users entering a particular location, the proxy VM can serve the video requests on behalf of the content application server.

Figure 6A:
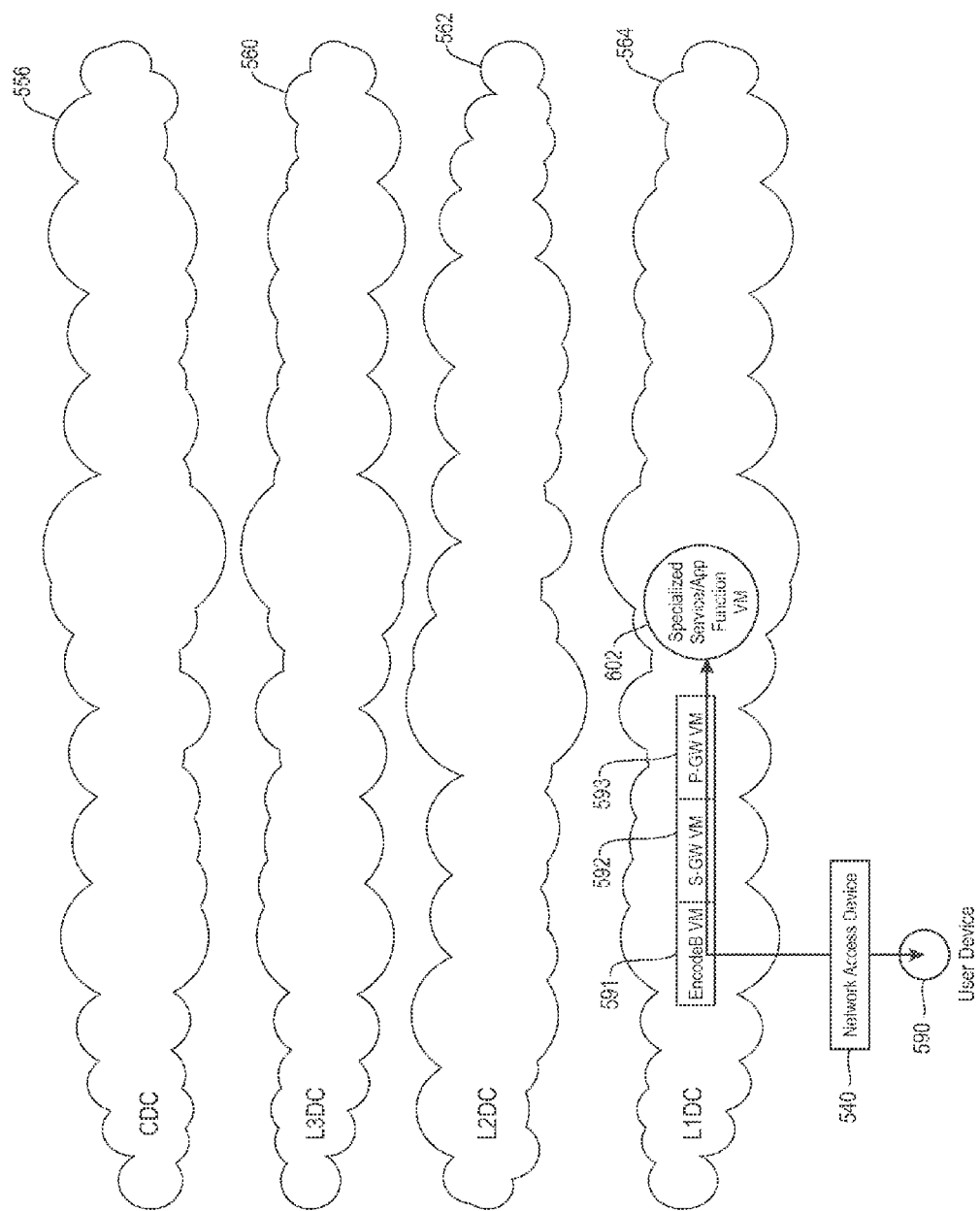
FIG. 6A through FIG. 6L include diagrams illustrating a graphical representation of a hierarchical function partitioning, according to an example embodiment of the present invention.

FIG. 6A is a diagram illustrating the utilization of a generic service or application function VM 602 connected to a collapsed packet gateway VM function. Such a service function VM 602 can include functions such as a load-balancer, a firewall, a network-attached storage (NAS) function, an application proxy service function, an inter-operator tunnel service function, or an M2M service layer function. Application function VMs can include, but are not limited to, content delivery applications, augmented reality applications, social networking applications, or gaming applications to connect packet-gateways associated with two different operators. FIG. 6A also depicts a user application 590 on a first device associated with a first user communicating through a network access device 540 to the network function VMs 591, 592, and 593, representing the upper layer ENodeB functions, S-GW functions, and P-GW functions, respectively, to exchange information with the service or application function VM 602, and wherein all VMs are placed at the L1DC 564.

Figure 6B:
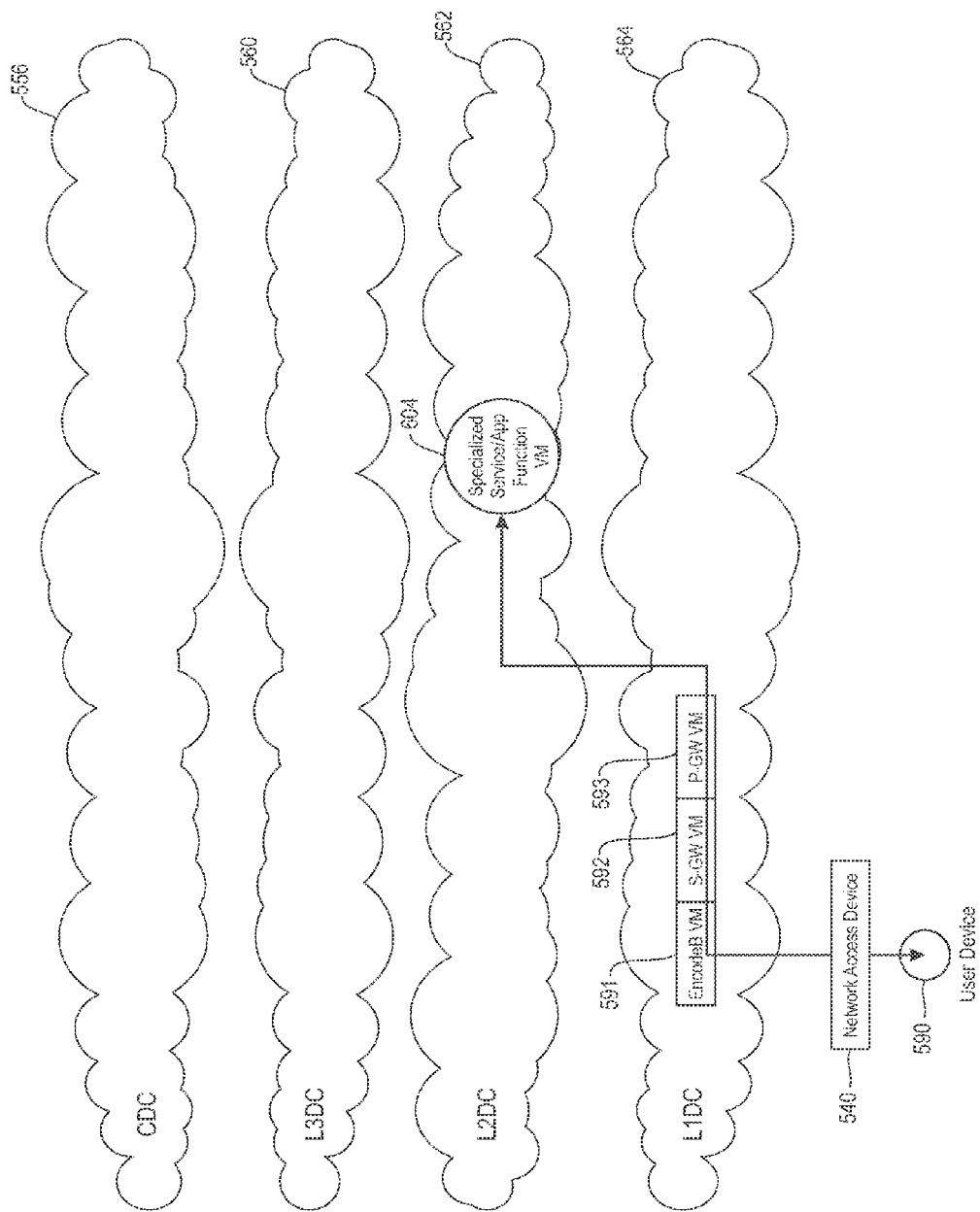

FIG. 6B is similar to FIG. 6A, but allows for the placement of a service and/or application function VM 604 at the L2DC 562. This can be carried out for specific functions that have lower DCS requirements or performance sensitivity requirements for the VM functions, so that these functions may be placed at an alternate data center (L2DC 562) to reduce costs of operation based on better resource availability at the L2DC 562, or based on policies associated with the VM function.

Figure 6C:
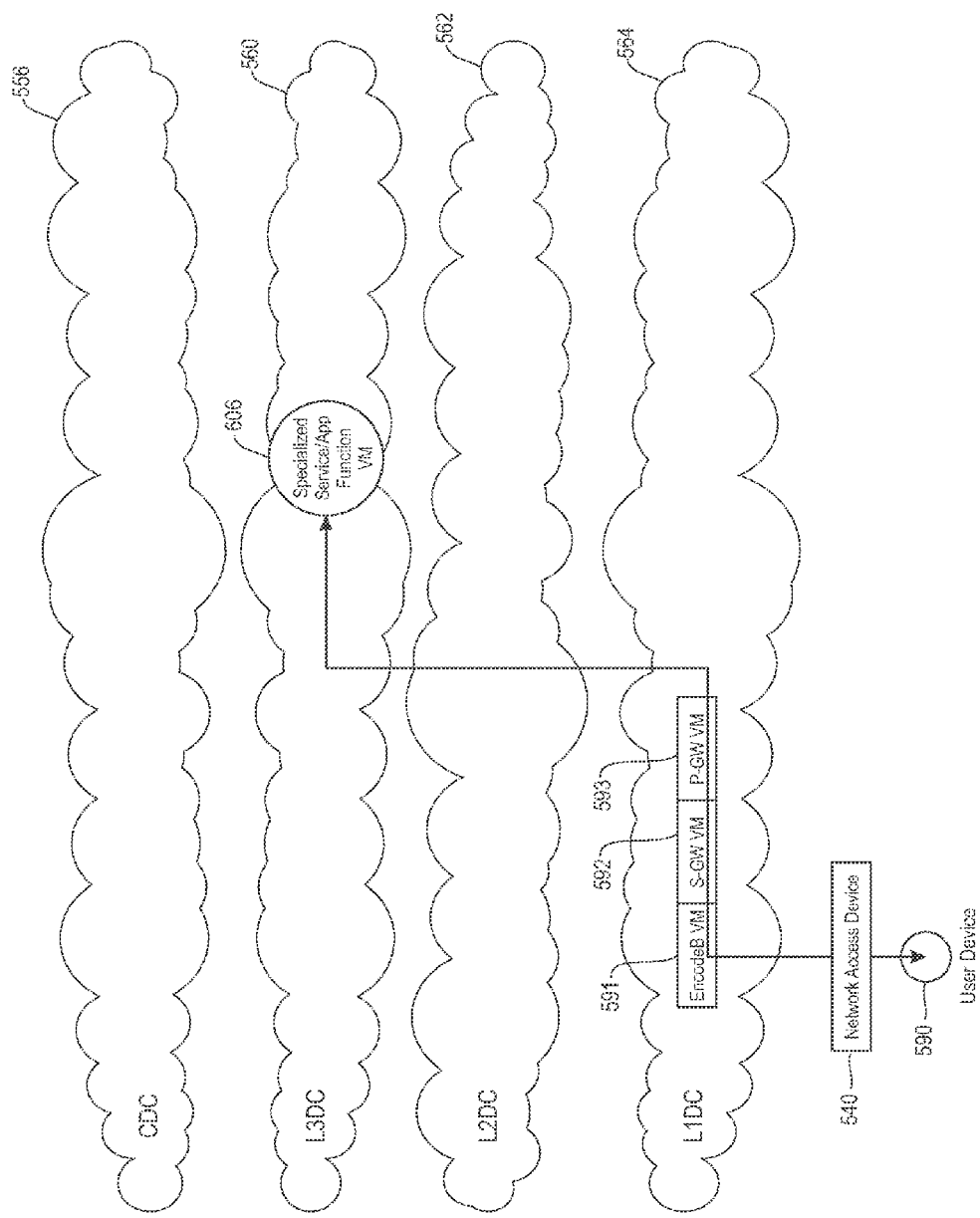
Figure 6D:
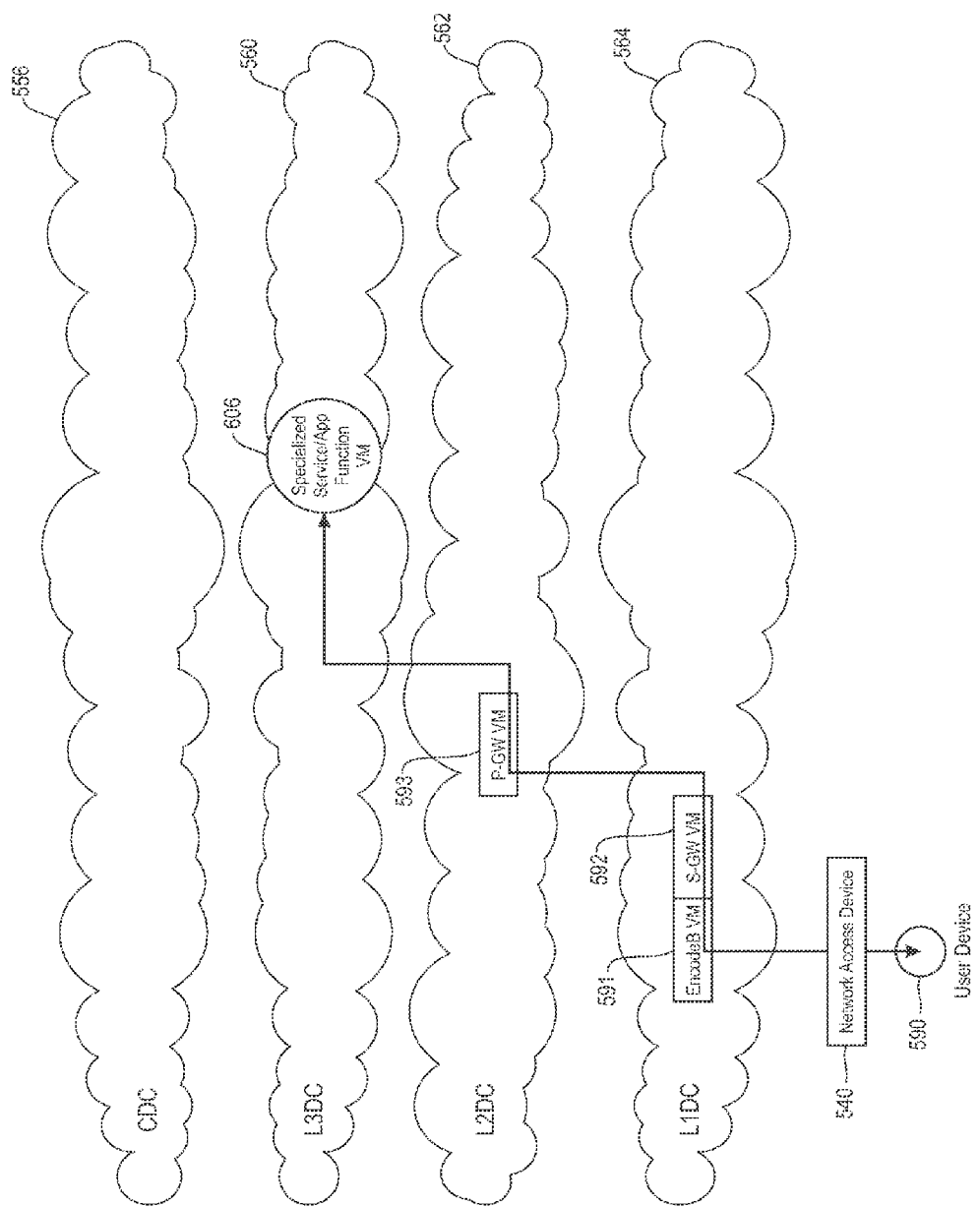

FIG. 6C is similar to FIG. 6B, but allows for the placement of a service and/or application function VM 606 at the L3DC 560, which can be carried out based on cost, resource availability, or policies associated with the VM function. FIG. 6D is similar to FIG. 6C, but allows for the placement of the packet gateway network function VM 593 at the L2DC 562, wherein the packet gateway network function VM 563 can have lower performance sensitivity requirements, allowing the placement of the VM higher up the data center hierarchy.

Figure 6E:
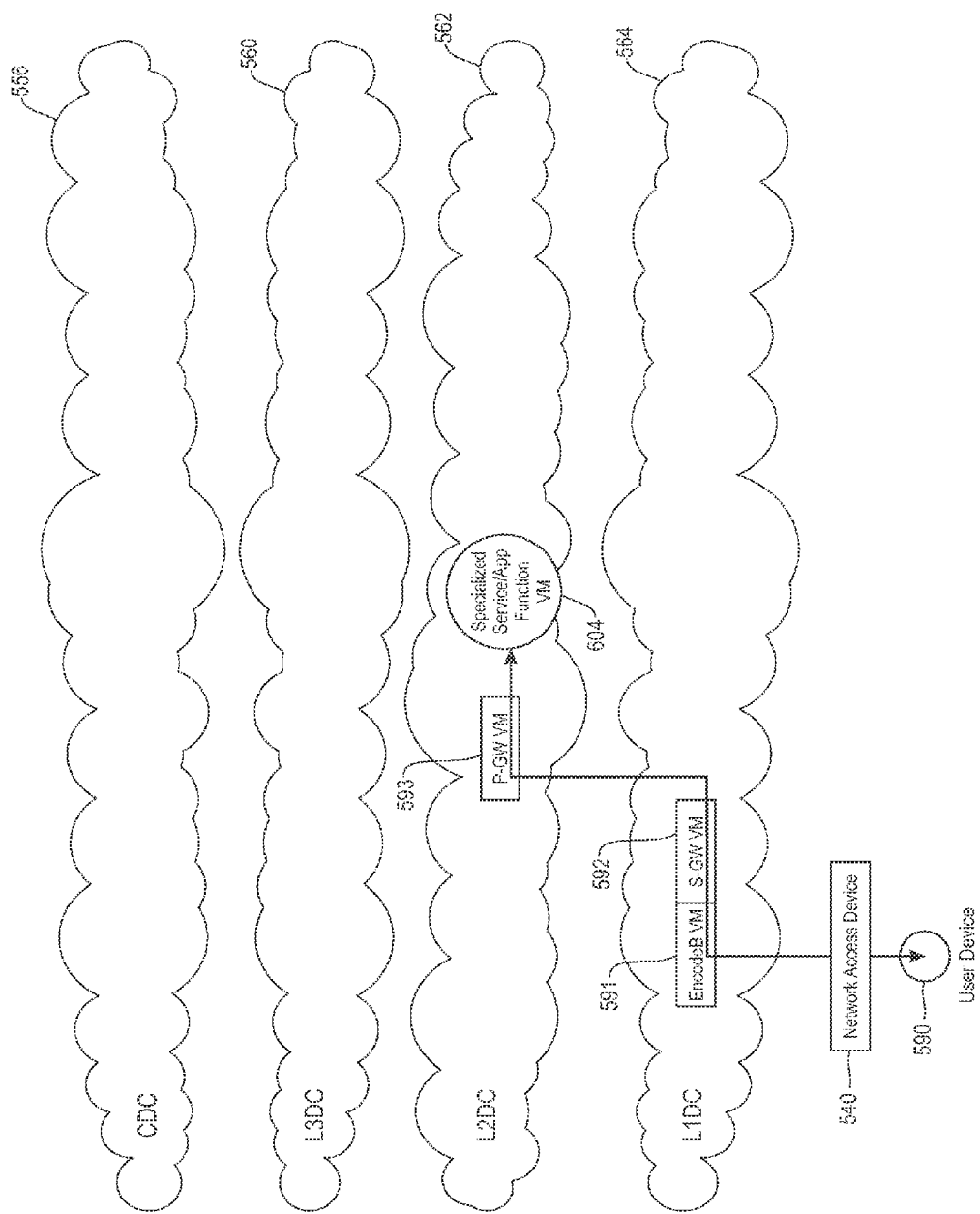

FIG. 6E is similar to FIG. 6D, but allows for the placement of the service and/or application function VM 604 at the L2DC 562, collocated with the packet gateway function VM 593, wherein the VM 604 may require a DCS measure to support the performance sensitivity desired for the VM function.

Figure 6F:
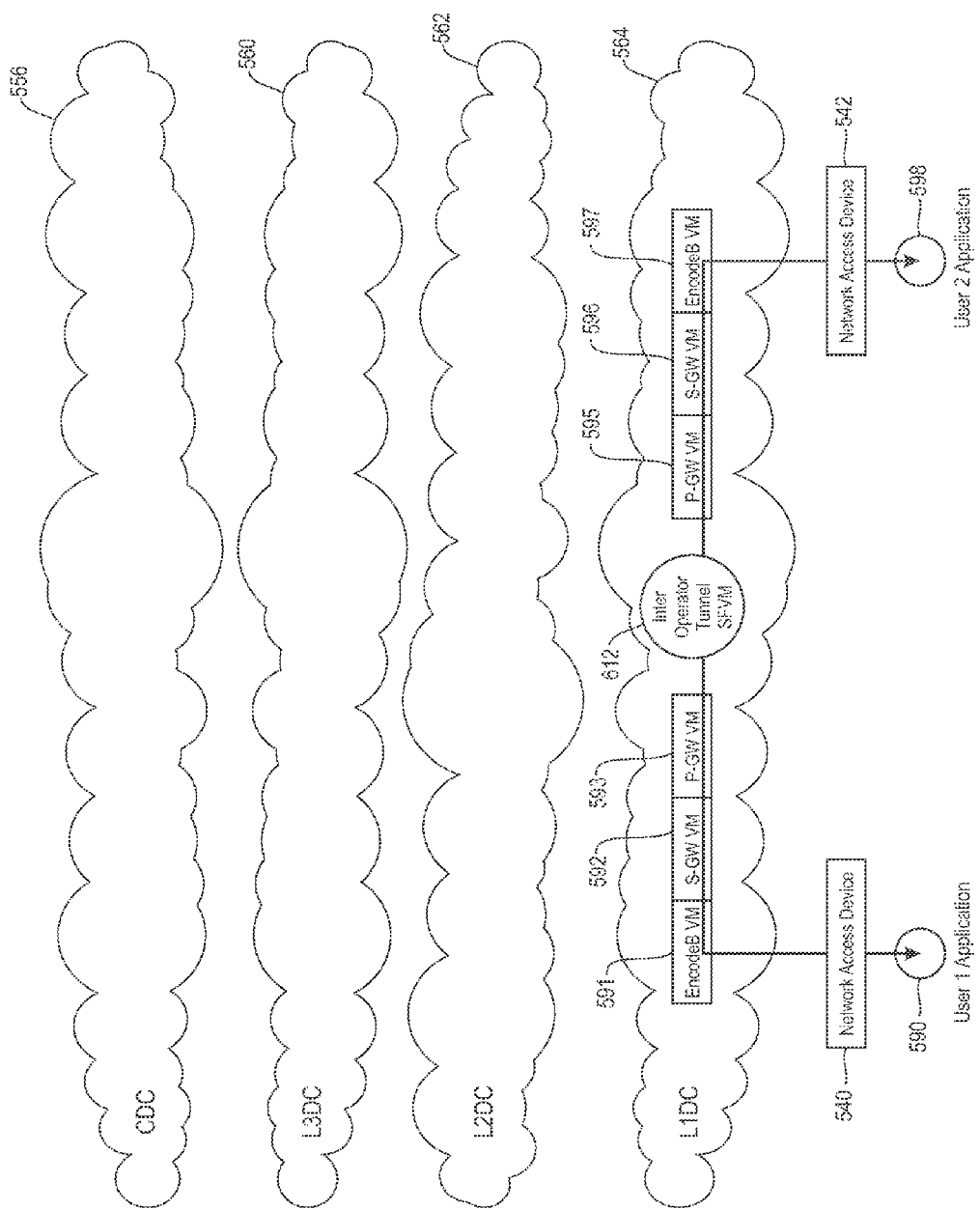

FIG. 6F is a diagram illustrating the utilization of an inter-operator tunneling service function to connect packet-gateways associated with two different operators. The inter-operator tunneling service function allows two users to accomplish end-to-end application paths such as for an end-to-end voice or video call, wherein the devices associated with the two users are connected to different operator networks. FIG. 6F depicts a user application 590 on a first device associated with a first user communicating through a network access device 540 to the network function VMs 591, 592, and 593, representing the upper layer ENodeB functions, S-GW functions, and P-GW functions, respectively, for the network associated with the first operator's network, communicating further from the P-GW function VM 593 via the inter-operator-tunnel service function 612 to reach the P-GW network function VM 595 associated with the operator's network associated with the second device associated with a second user, and further reaching user application 598 associated with the second device via the S-GW and ENodeB VM functions 596 and 597, and the network access device 542 associated with the second device.

Figure 6G:
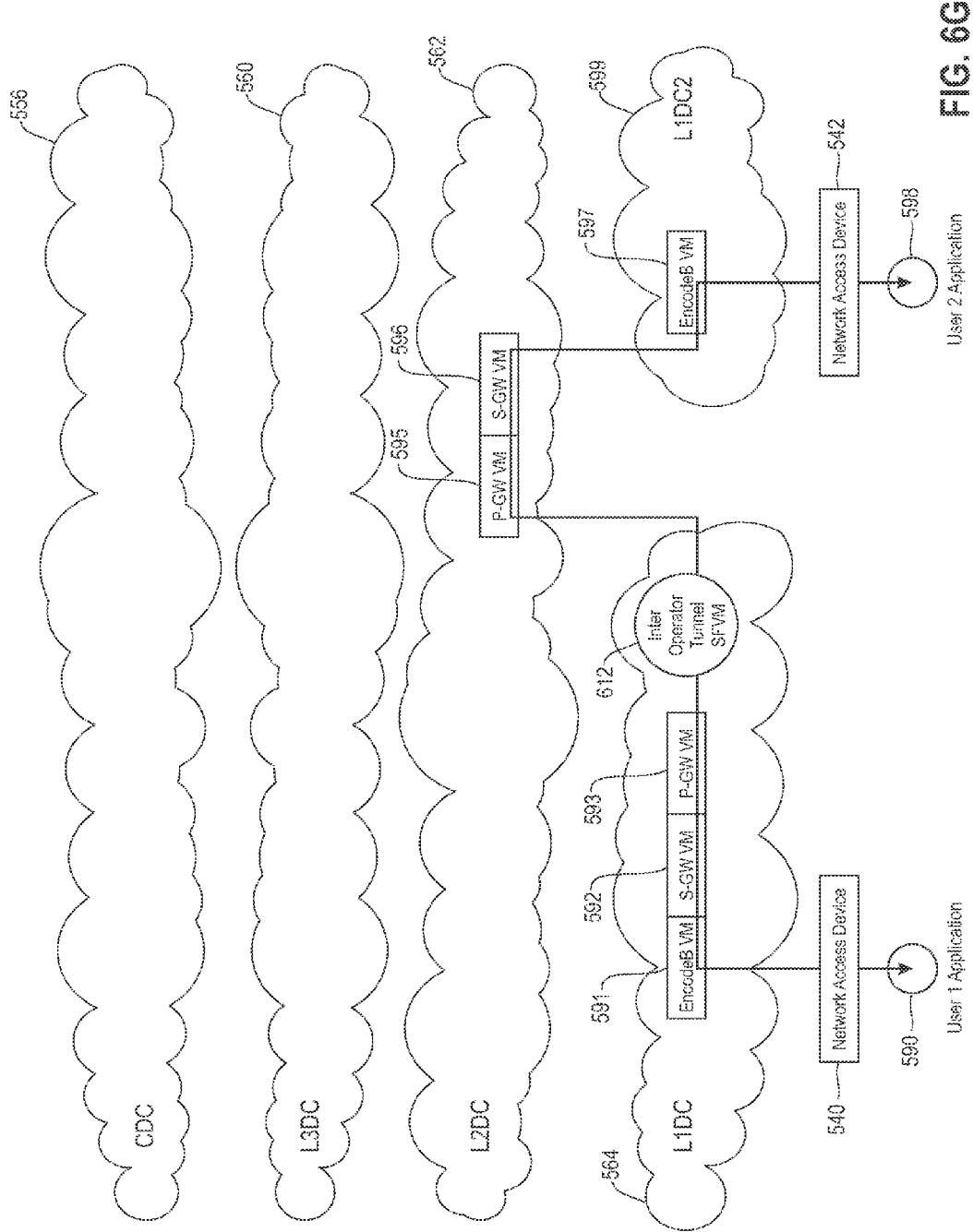

FIG. 6G depicts a similar capability as depicted in FIG. 6F, wherein the P-GW function VM 595 and the S-GW function VM 596 are hosted on a different data center 562 (L2DC), and the ENodeB VM function 597 is hosted on another data center 599 (L1DC2), ultimately reaching the user application 598 via the network access device 542. It is to be appreciated and acknowledged by those with skill in the art that other variations of flows are possible for optimized end-to-end connectivity based on the locations of the network functions associated in the data center hierarchies in the different operator networks. In the above discussion, the network access devices 540 and 542 can be different in general, but they can be identical as well. In other embodiments of the invention, some of the network functions may be executed by traditional hardware appliances instead of VMs. For example, both the ENodeB and S-GW function VMs may be executed by hardware appliances, whereas the P-GW functions and the inter-operator tunneling service function may be executed in VMs in data centers. Alternatively, all network functions associated with one of the users can be executed in hardware appliances, wherein the functions associated with the other user and the inter-operator-tunneling service function can execute in VMs in data centers.

Figure 6H:
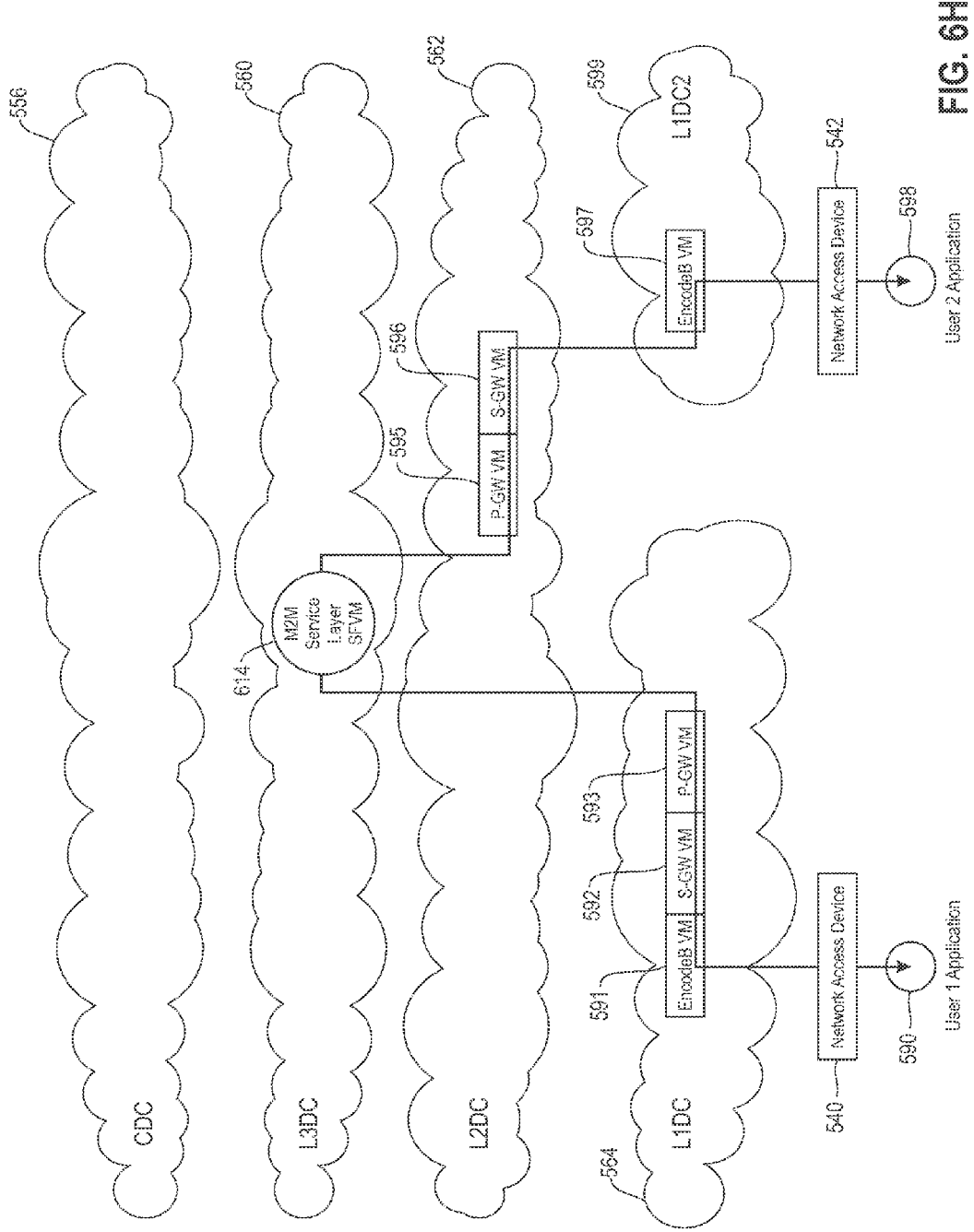

FIG. 6H is similar to FIG. 6G, but without an inter-operator-tunnel, and wherein FIG. 6H depicts the usage of an M2M service layer VM service function 614 at the L3DC 560 that provides for M2M services between two M2M devices 590 and 598. The M2M service layer can support asynchronous messaging such as publish/subscribe services for the M2M devices (for example, wherein device 598 subscribes to information published by device 590 via a broker M2M service layer), enable RESTful resource exchange with the M2M devices, and enable discovery and control functions associated with the M2M devices. The M2M service layer can also provide support for message filtering, message translation, message aggregation and de-aggregation, and other M2M services for the two devices.

Figure 6I:
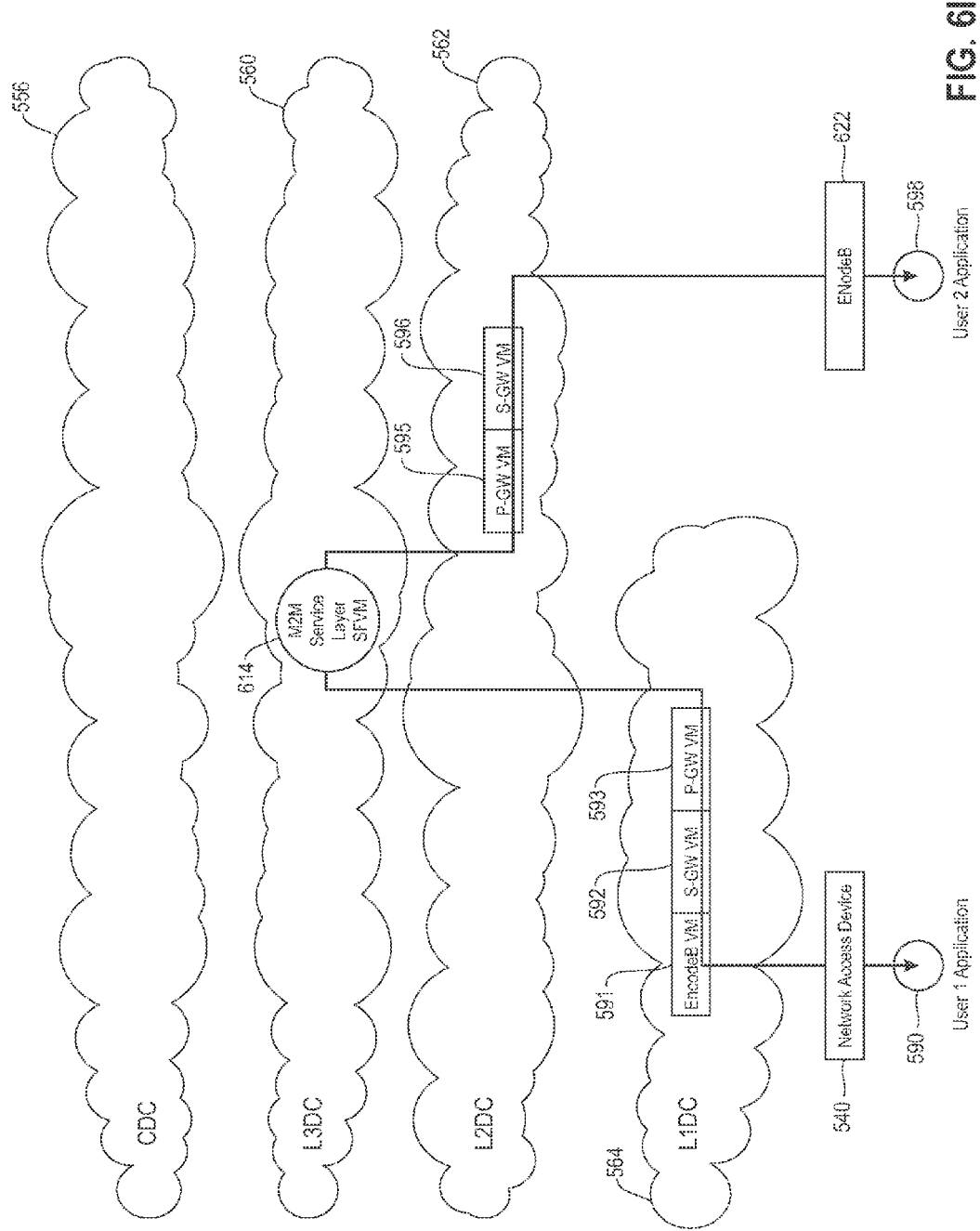

FIG. 6I is similar to FIG. 6H, but allows for some network functions to be entirely supported by a hardware appliance while co-existing with other network functions that are processed by software appliance VMs. In this case, the entire ENodeB function is processed by a hardware ENodeB appliance 622.

Figure 6J:
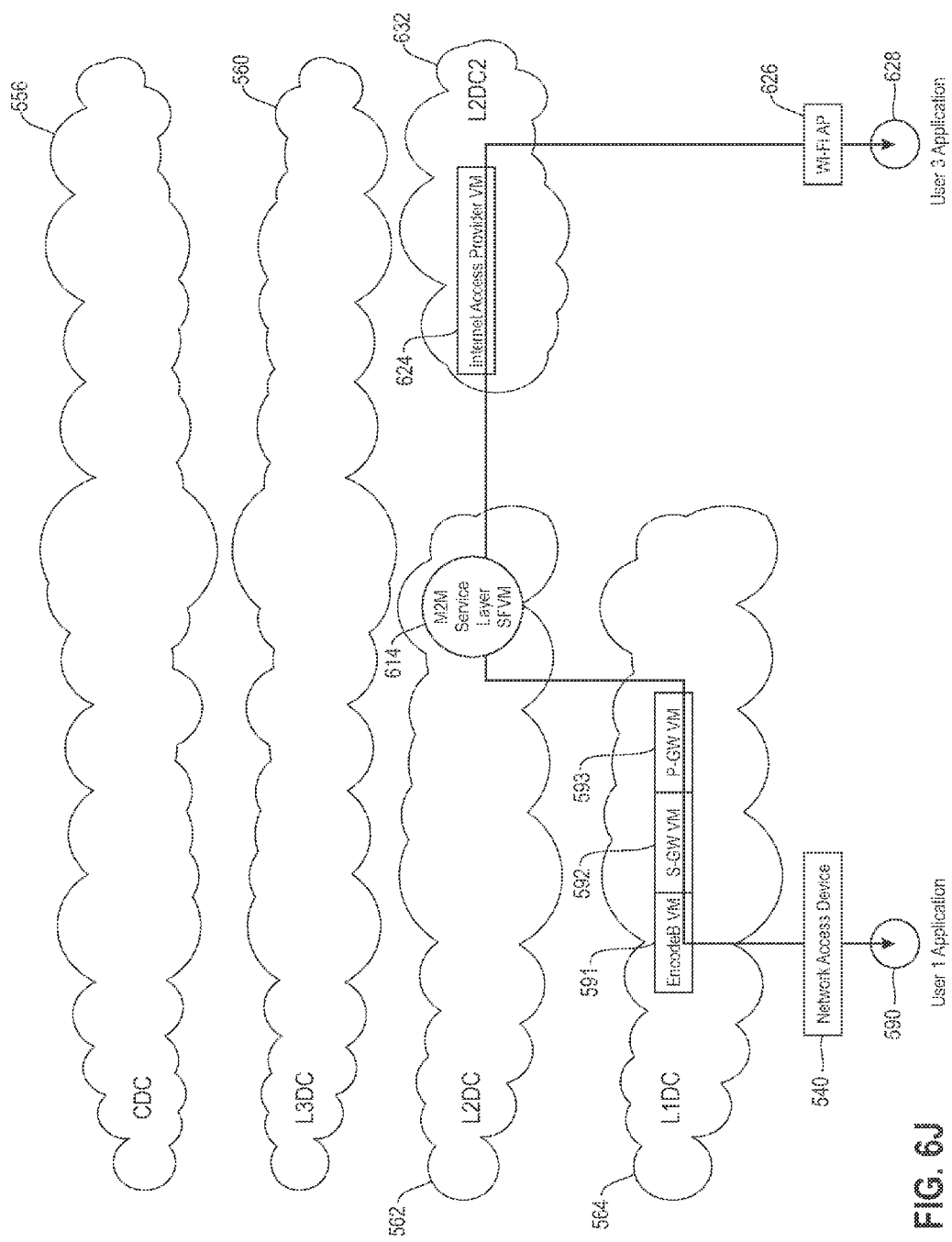

FIG. 6J is similar to FIG. 6I, but wherein M2M device 590 interacts with another M2M device 628 through the M2M service layer service function VM 614, and wherein device 628 accesses an alternate network though a Wi-Fi Access Point 626 whose services are provided by an IT service provider VM 624 in a L2 level data center 632.

Figure 6K:
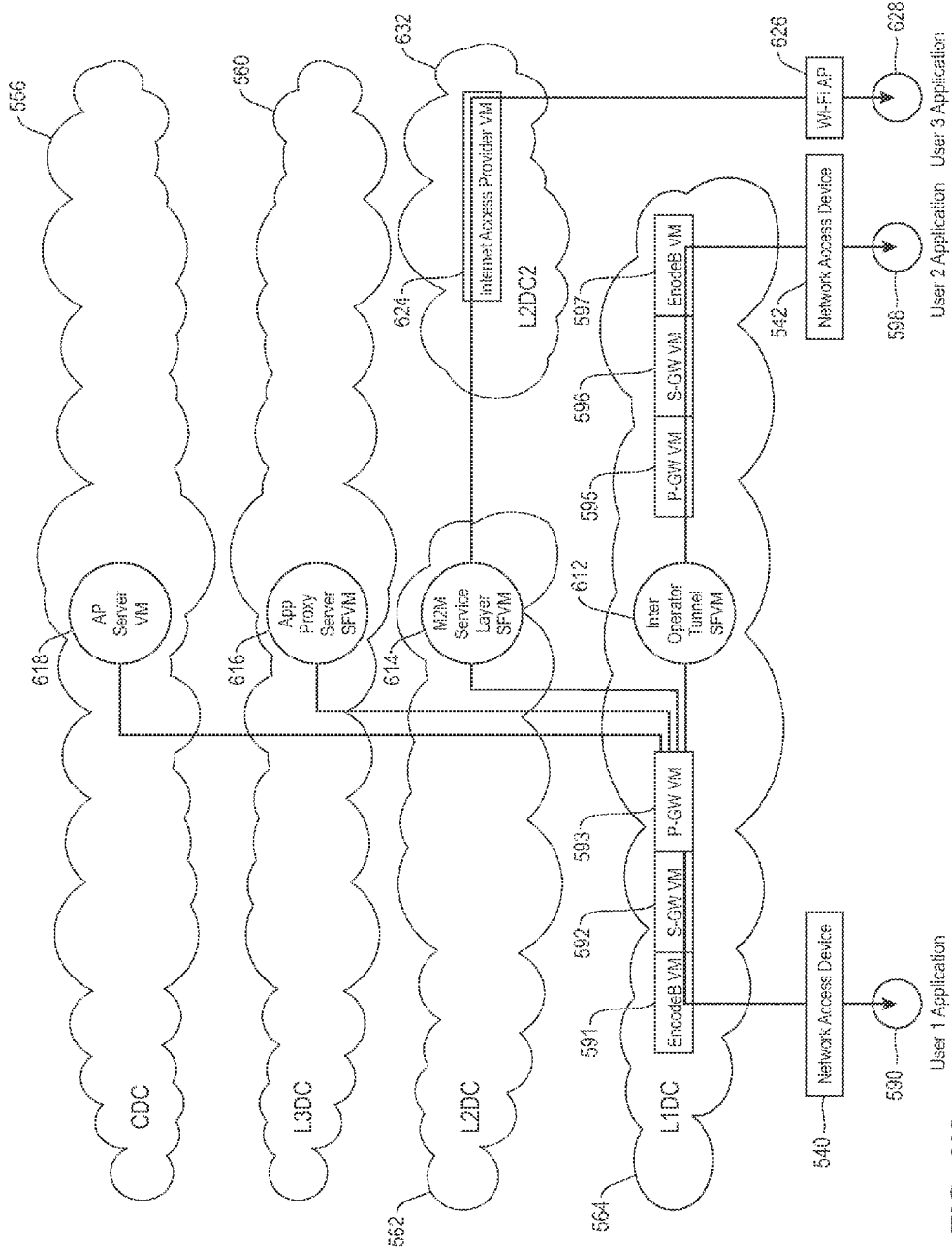

FIG. 6K depicts a super-position of the various partitioning options described with an inter-operator tunnel service function VM 612 at the L1DC 564, an M2M service layer service function VM 614 at the L2DC 562, an application proxy service function VM 616 at the L3DC 560, and an application server VM function 618 at the CDC 556. All of these functions may be placed as shown in the hierarchy of FIG. 6K, and can concurrently support device 590 based on the desired performance sensitivities associated with these functions and the DCS measures associated with the data centers in the data center hierarchy.

Figure 6L:
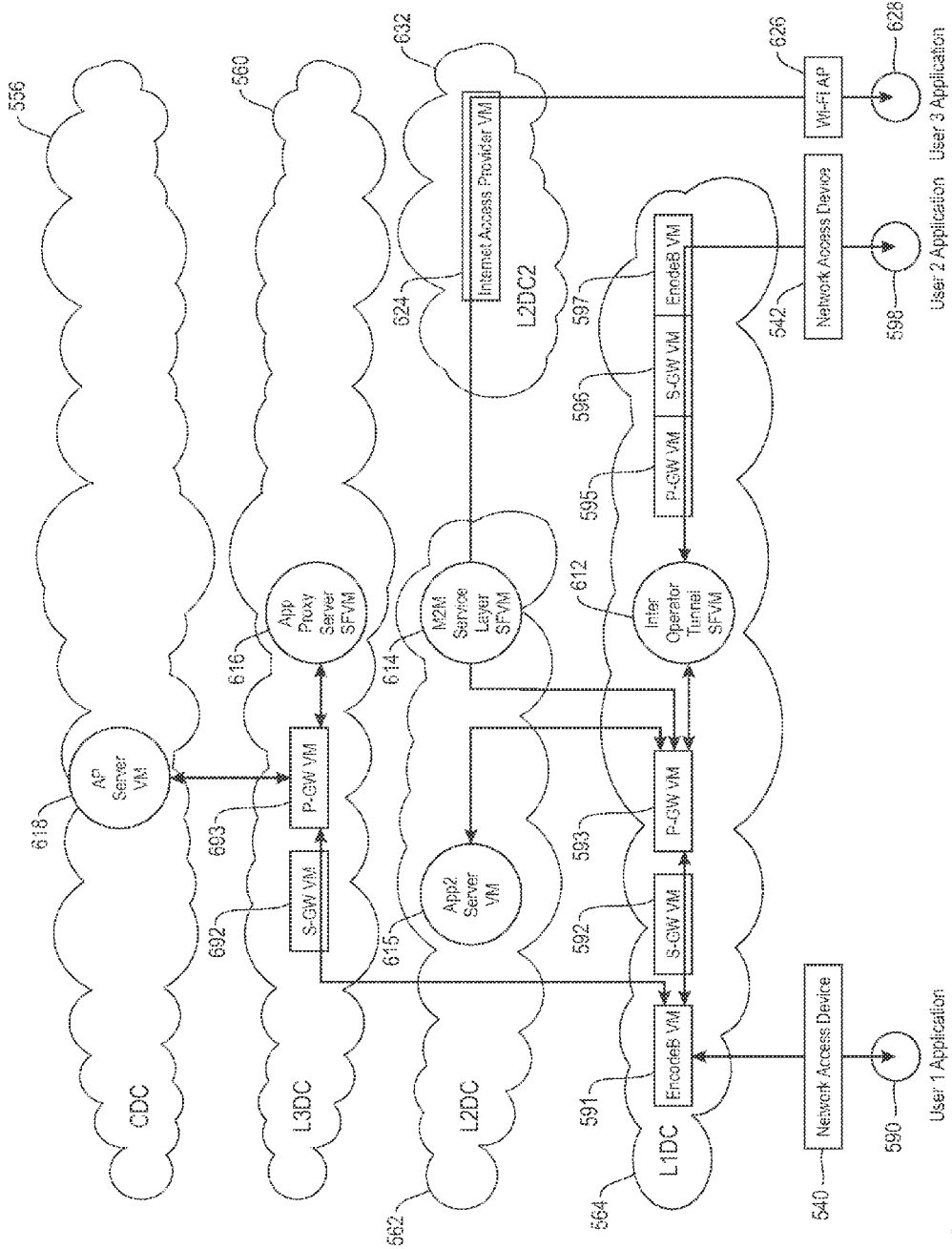

FIG. 6L depicts function replication for network functions with concurrent utilization of the same network function at different data center locations in the data center hierarchy. In this case, ENodeB network function VM 591 interacts concurrently with S-GW and P-GW functions 592 and 593, respectively, at the L1DC 564 and with the S-GW and P-GW functions, 692 and 693, respectively, at the L3DC 560, wherein the application server VM 618 and application proxy server VM 616 interact via the P-GW 693, and the application server (App2 Server) VM function 615, the M2M service layer 614, and the inter-operator tunnel VM 612 interact via packet gateway VM function 593. Accordingly, FIG. 6L illustrates the degree of flexibility of partitioning, replication, and concurrency that is possible, taking into account the performance sensitivities of all network, service, and application function VMs that need to be supported, and the DCS measures associated with the data centers in the data center hierarchy in the system.

Figure 7:
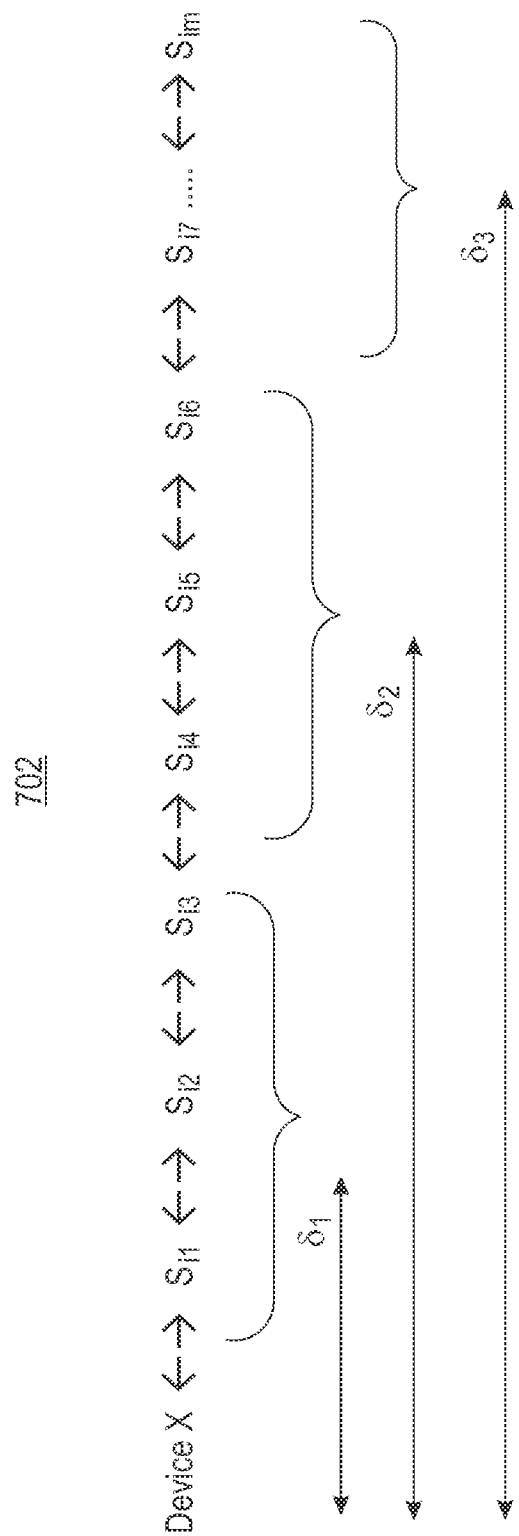
FIG. 7 is a diagram illustrating differentiated services, according to an embodiment of the present invention.

FIG. 7 is a diagram illustrating a graphical representation 702 of a hierarchical function partitioning, according to an example embodiment of the present invention. By way of illustration, let a set of m physical nodes $P_1, P_2, P_3, P_4, \ldots P_m$ execute network functions in a given network architecture with increasing DCS (such as latency sensitivity, for example) for function execution relative to a device X or a group of devices in a given geographical area A. Also, let a set of functions $S_{ij}$ be executed on the above m physical nodes in sequence to execute a network service $S_i$. $S_i$ is implemented as a sequence of functions, and the execution of the sequence of functions is partitioned in a hierarchy of DCs with DCS measures (for example, latency sensitivity values) $\delta_1 \geq \delta_2 \geq \delta_3, \ldots$. Accordingly, an example embodiment of the invention can include determining connected subsets of functions with reduced requirements on DCS measure values to execute in a hierarchy of DCs. In the example depicted in FIG. 7, a first subset includes $S_{i1}$, $S_{i2}$, and $S_{i3}$ on a first DC handling DCS-measure sensitivity $\delta_1$. Also, a second subset includes $S_{i4}$, $S_{i5}$, and $S_{i6}$ on a second DC handling DCS-measure sensitivity $\delta_2$, while a third subset includes $S_{i7}, \ldots, S_{im}$ on a third DC handling DCS measure $\delta_3$.

Partitioning of functions can be based on techniques such as, for example, agglomerative clustering, to determine the most appropriate placement of functions while meeting performance requirements in the system. It is possible that some functions may incur additional overhead based on their placement. However, when considering overall tasks that need to be performed that include a combined execution of functions, the overall task may complete earlier than required based on the improvement in execution of other functions based on their placement. If all functions are placed such that the functions provide lower overhead than their traditional placement with hardware appliances, the overall system can potentially provide a significant improvement in performance with the hierarchical placement of functions.

As detailed herein, one or more embodiments of the invention can include varying partitioning for each network function across DCs. Constraints pertaining to, for example, network load, storage and computation can also impact partitioning. Subsets of functions can be executed through connected processes and/or threads within a specific VM or a software container or a bare-metal instance, wherein a software container provides software isolation in an operating system (OS) environment without the need for specific VMs for different functions, and wherein a bare-metal instance represents the execution of a function or a set of functions directly on a hardware platform without the need for a VM hypervisor. Additionally, VMs and/or bare-metal instances can be interconnected to connect functions executing therein.

Further, at least one embodiment of the invention includes function splitting, which can include splitting a function into north and south facing functions that can be mapped to different DCs. Also, as described herein, one or more embodiments of the invention can include performing energy efficient operations and/or differentiated services. By way of example, such an operation and/or service can include collapsing all functions into a given DC and allowing other DCs to sleep. Additionally, resource partitioning can be implemented to support applications and/or services. For instance, resources can be allocated to support hierarchical applications such as virtual hierarchical CDNs or hierarchical social networks.

Split functions can include, for instance, splitting MME functions with an upper MME-network-function-VM and a lower MME-network-function-VM in the DC network hierarchy. The lower MME-network-function-VM can provide MME services for users being managed lower in the DC network hierarchy, and can occasionally synchronize user location information with an upper-MME-network-function-VM. Also, a lower MME-network function-VM can request a change in a lower-MME-network-function-VM to the upper-MME-network-function-VM based on the location of the user.

Split functions can also include, for instance, splitting S-GW functionality into S-GW-South and S-GW-North functions, such that S-GW-South functions that have a lower latency tolerance can move to a DC closer to the devices (or UE), whereas S-GW-North functions with a higher latency tolerance can move to DC farther away from the devices. Additionally, similar splitting implementations can be carried out for SGSN, GGSN, and RNC functions in UMTS, as well as ENodeB and P-GW functions in LTE.

Further, north functions can be collapsed to collocate with south functions if DC resources in the south DC are sufficient to support such functions. When all functions collapse to a lower DC, the entire core set of network functions can be supported at the lower DC, enabling faster processing, internet access and/or applications/services access.

Another aspect of the invention includes distributed policy and resource management for cellular network function virtualization. At least one embodiment of the invention includes implementing global and local policies to manage DC resources and/or the users being serviced at the DC. Also, a global policy for a set of users can be pushed locally, and, in addition, a local policy can further refine how the resources and/or users are managed.

Figure 8:
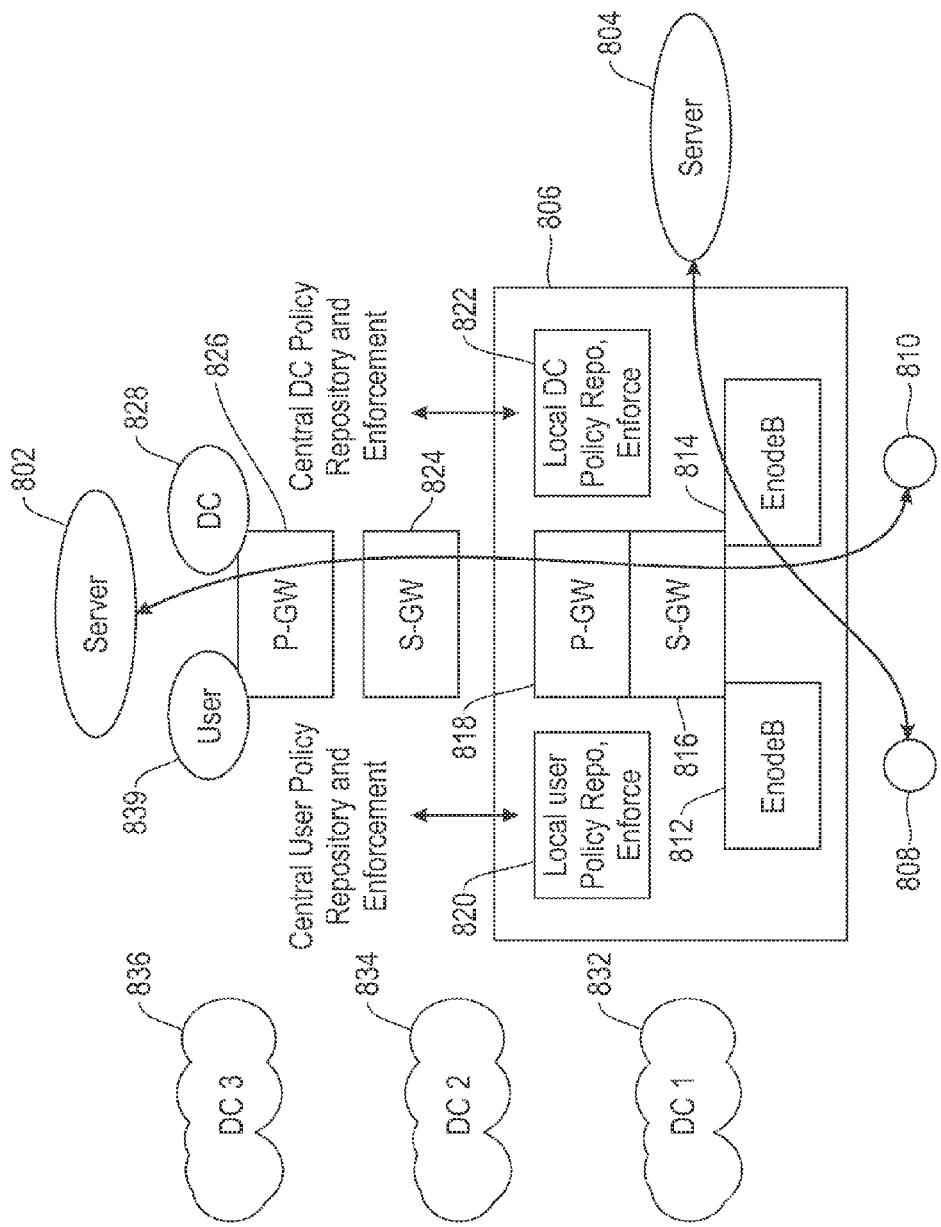
FIG. 8 is a diagram illustrating a network with distributed policy management, according to an example embodiment of the present invention.

FIG. 8 is a diagram illustrating a network with distributed policy management, according to an example embodiment of the present invention. By way of illustration, FIG. 8 depicts servers 802 and 804, DCs 828, 832, 834 and 836, user 830, P-GW 826, S-GW 824 and a collapsed network 806. Collapsed network 806 further includes ENodeB 812, ENodeB 814, S-GW 816, P-GW 818, local user policy repository enforcement component 820 and local DC policy repository enforcement component 822. FIG. 8 also depicts component 808 and component 810 that represent client applications interacting with remote server 802 and local server 804, respectively.

Such an example embodiment as depicted in FIG. 8 utilizes virtualized software functions and provides distributed policy managers as well as differentiated services. Specifically, as detailed in the example embodiment in FIG. 8, local policies (via component 820) are used for route optimization and latency reduction. Additionally, DC policies (via component 822) are used for resource management.

Accordingly, at least one embodiment of the invention includes splitting policy management and enforcement via a distributed (or local) policy manager to resolve and enforce policies. By way of example, such an embodiment can include decoupling policy enforcement from PGW/GGSN for cellular networks to implement the enforcement at local nodes such as ENodeB to enable innovative services by techniques such as rate control or DCS-aware scheduling.

Further, at least one embodiment of the invention includes context-aware distributed policy management. Such an embodiment can include a flexibility of policy enforcement based on, for example, the time of day, the level of congestion, and/or application requirements.

Figure 9:
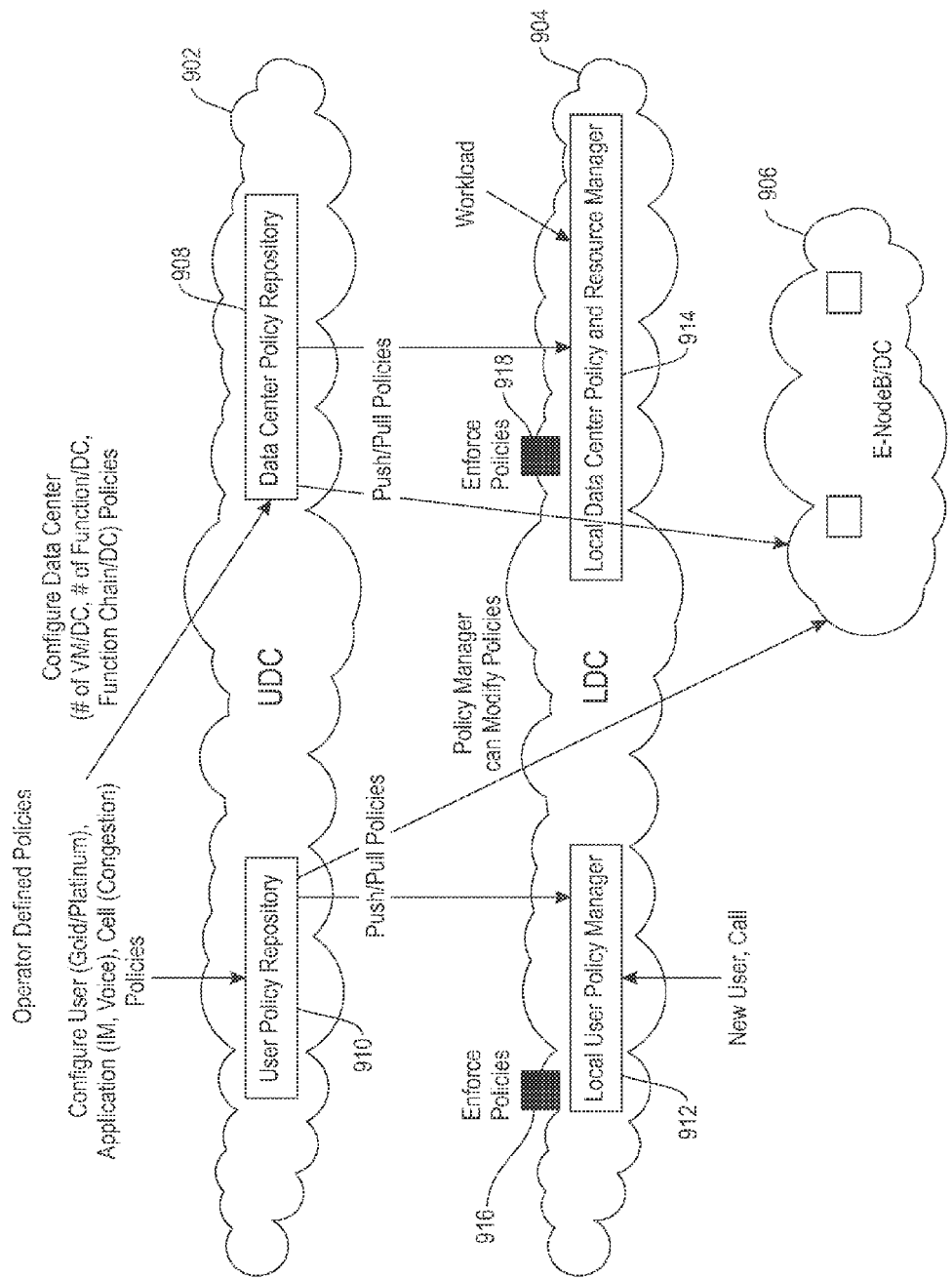
FIG. 9 is a diagram illustrating central and/or distributed policy managers, according to an embodiment of the invention.

FIG. 9 is a diagram illustrating central and/or distributed policy managers, according to an embodiment of the invention. By way of illustration, FIG. 9 depicts UDC 902, which includes a user policy repository 910 and a DC policy repository 908. Also, FIG. 9 depicts LDC 904, which includes a local user policy manager component 912, a local DC policy and resource manager component 914, as well as policy enforcement components 916 and 918. Further, FIG. 9 additionally includes ENodeB/DC 906. As illustrated, FIG. 9 depicts the ability to have both local and global policy management in the system, wherein local policies can be used to refine local usage of resources in LDC 904 on a fine-grain time-scale, and global policies from UDC 902 can refine policies for such resource management on a coarser time-scale as such global policies become refined.

In an example embodiment such as depicted in FIG. 9, user policies can pertain, for example, to rate control, scheduling, resource management, latency control, time-of-day pricing, congestion-based pricing, etc. Similarly, DC policies can pertain, for example, to VM scheduling, network function placement, routing via DCs, energy management, brown-out policies, etc.

Consider an affinity matrix A, with rows corresponding to data centers and columns corresponding to virtualized functions wherein an entry $a_{i,j}$ (1 or 0) can indicate whether function j can (value 1) or cannot (value 0) be collocated with a given data center i. Such an affinity matrix definition can be based on regulatory requirements or security requirements or other operator policies. Based on the choices available in the affinity matrix, an appropriate partitioning of functions can be suggested. Functions may also be replicated as needed to differentially serve users and/or to provide fault tolerance in the system for function processing.

Figure 10:
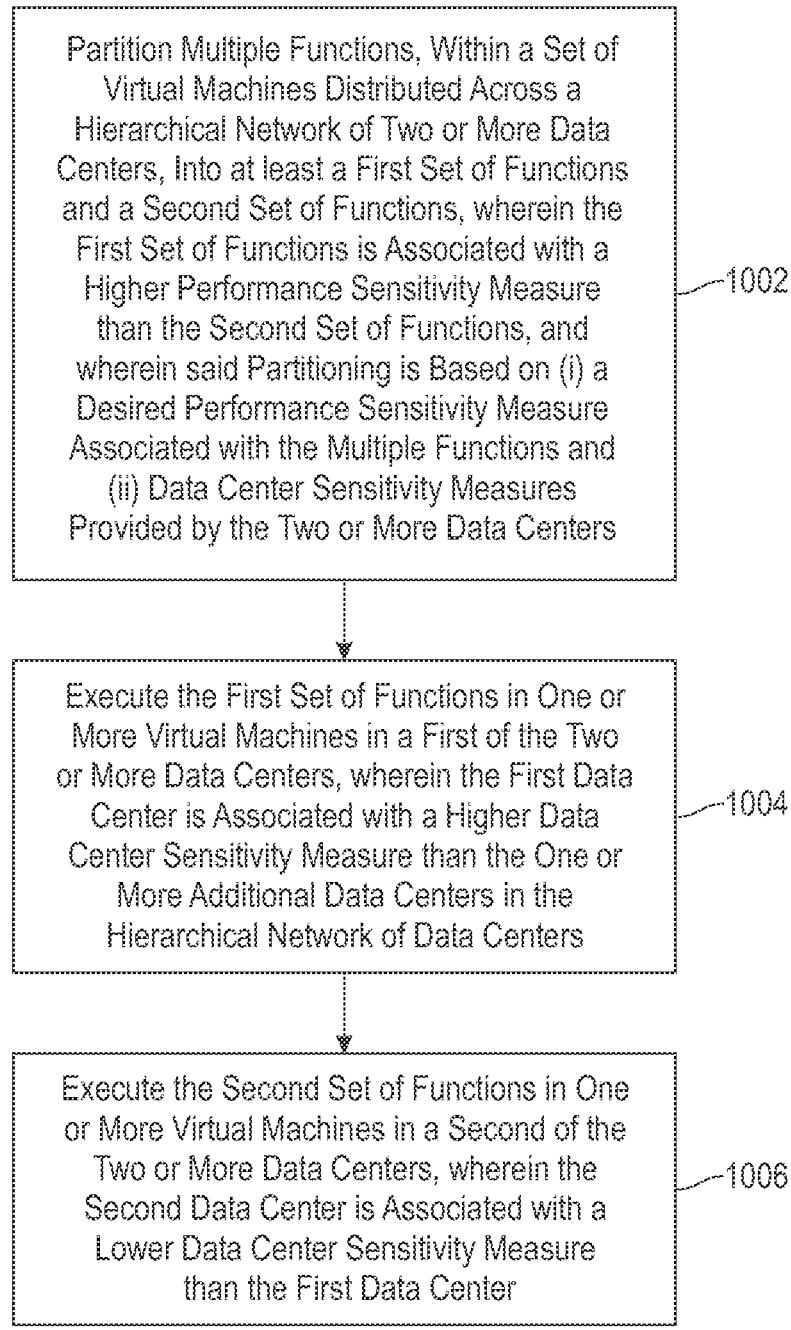
FIG. 10 is a flow diagram illustrating techniques according to an embodiment of the invention.

FIG. 10 is a flow diagram illustrating techniques according to an embodiment of the present invention. Step 1002 includes partitioning multiple functions, within a set of virtual machines distributed across a hierarchical network of two or more data centers, into at least a first set of functions and a second set of functions, wherein the first set of functions is associated with a higher performance sensitivity measure than the second set of functions, and wherein said partitioning is based on (i) a desired performance sensitivity measure associated with the multiple functions and (ii) data center sensitivity measures provided by the two or more data centers. The multiple functions can include multiple network functions associated with providing a network service in the hierarchy of two or more data centers. Also, in at least one embodiment of the invention, the partitioning step can be carried out recursively. Further, as detailed herein, the set of virtual machines can include, for example, a machine-to-machine service layer service function virtual machine and/or an application proxy function virtual machine.

Partitioning can include placing one or more cloud application virtual machine functions for a given user requiring higher performance sensitivity in a cloud data center with a higher data center sensitivity measure relative to the given user. Additionally, partitioning can be carried out by a hierarchical function manager in a distributed manner across the two or more data centers. The hierarchical function manager can be assisted by a local hierarchical function manager that manages one or more functions for a local data center among the two or more data centers. Also, the hierarchical function manager can trigger a request for resource allocation for one or more of the multiple functions from one data center to another data center in the hierarchical network based on the availability of resources, the cost of available resources, the performance sensitivity measure associated with the one or more functions for which resource allocations are required, and data center sensitivity measures.

Further, in at least one embodiment of the invention, the performance sensitivity measure is based on one or more of an expected round trip delay, an overall latency of response, an expected bandwidth, the number of round trips required to accomplish a task, the computation requirements for function execution, the storage requirements for function execution, one or more dynamic wireless link conditions for a mobile device that utilizes a given function, and a given cost for function execution.

Step 1004 includes executing the first set of functions in one or more virtual machines in a first of the two or more data centers, wherein the first data center is associated with a higher data center sensitivity measure than the one or more additional data centers in the hierarchical network of data centers. The data center sensitivity measure can be based, for example, on one or more of a latency sensitivity measure, a bandwidth availability measure, a network availability measure, a network utilization measure, a cost of service measure, a computing resource availability measure, a storage resource availability measure, dynamic link conditions on one or more networks associated with a user or set of users, and an energy availability measure. One or more of such measures can also be time-varying, and/or different for different network or service or application functions.

Step 1006 includes executing the second set of functions in one or more virtual machines in a second of the two or more data centers, wherein the second data center is associated with a lower data center sensitivity measure than the first data center. In at least one embodiment of the invention, the location of the first data center is closer to a user device than the second data center.

The techniques depicted in FIG. 10 can also include replicating the multiple functions across the hierarchical network of two or more data centers based on an ability of the two or more data centers to meet performance sensitivity measures associated with the multiple functions. Additionally, in at least one embodiment of the invention, one or more of the multiple functions are collapsed into one of the two or more data centers to provide one or more of a reduction in latencies associated with inter-function communications, improvement in end-to-end application performance, and differentiated services for one or more users.

Further, the techniques depicted in FIG. 10 can also include partitioning resources across the two or more data centers to support two or more network operators, and providing an inter-operator tunneling service between the operator networks in the hierarchical network of two or more data centers, wherein said providing comprises establishing an encrypted data tunnel between a packet gateway virtual machine of a first of the two or more network operators and a packet gateway virtual machine of a second of the two or more network operators. Also, at least one embodiment of the invention includes classifying each of the two or more data centers based on ability to respond to one or more user devices in a given geographic area and/or a networked region.

The techniques depicted in FIG. 10 can additionally include splitting one of the multiple network functions into multiple sub-functions; partitioning the multiple sub-functions into at least a first set of sub-functions and a second set of sub-functions, wherein the first set of sub-functions is associated with a higher performance sensitivity measure than the second set of sub-functions; executing the first set of sub-functions in one or more virtual machines in the first data center; and executing the second set of sub-functions in one or more virtual machines in the second data center.

In at least one embodiment of the invention, steps 1002, 1004 and 1006 can be performed dynamically for each of multiple users. Also, in at least one embodiment of the invention, steps 1002, 1004 and 1006 can be performed dynamically for a subset of users from multiple users, wherein the subset of users corresponds to a given criterion, wherein the given criterion comprises one or more quality requirements of the users, one or more operator network constraints, and/or a cost of services associated with the users.

Additionally, the techniques depicted in FIG. 10 can include dynamically placing the set of virtual machines across the hierarchical network of two or more data centers based on one or more attributes, wherein said dynamically placing includes replicating one more of the virtual machines across the two or more data centers. The attributes can include (i) availability of computing resources in each of the two or more data centers, (ii) latency requirements associated with the multiple functions, (iii) capabilities of the two or more data centers to meet one or more latency requirements, (iv) a cost of service in the two or more data centers, (v) availability of storage resources in each of the two or more data centers, (vi) availability of energy resources in each of the two or more data centers, (vii) one or more link conditions associated with one or more users being served by the two or more data centers, (viii) availability of one or more networks connected to each of the two or more data centers, and/or (ix) the load on the hierarchical network of two or more data centers.

Further, the techniques depicted in FIG. 10 can include interacting with one or more physical network nodes in the hierarchical network of two or more data centers to obtain a policy for a virtual machine partitioning scheme; decoupling enforcement of the policy to implement the policy at one or more local nodes of the hierarchical network of two or more data centers; and enforcing the policy based on one or more context attributes, wherein the one or more context attributes comprise (i) time of day, (ii) congestion in the hierarchical network of two or more data centers, (iii) cost of service in the two or more data centers, and/or (iv) requirements of one or more users and/or applications. Also, at least one embodiment of the invention includes predicting an expected usage of resources across the two or more data centers, wherein the resources comprise one or more of a computing resource, a storage resource, a networking resource, and an energy resource, and wherein said predicting is based on one or more of a static policy input, a dynamic policy input, dynamic information of resource requirements in the two or more data centers, overprovisioning of resources based on anticipated demand, and an internal estimate of dynamic usage requirements; and determining a future allocation of resources across the two or more data centers based on said predicting.

The techniques depicted in FIG. 10 can further include assigning a given one of the multiple functions to a given one of the two or more data centers to support a set of users based on the data center sensitivity measure corresponding to the given data center and the performance sensitivity measure corresponding to the given function. Also, at least one embodiment of the invention includes enabling a given one of the multiple functions to execute in a software container in a given virtual machine from the set of virtual machines; and migrating the given function between two of the two or more data centers based on the data center sensitivity measures of the two data centers, the performance sensitivity measure associated with the given function, and a cost of migration associated with the given function.

Additionally, the techniques depicted in FIG. 10 can also include implementing function replication with concurrent utilization of a given network function at two or more data center locations in the hierarchical network of data centers.

Additionally, as detailed herein, at least one embodiment of the invention includes partitioning multiple functions, within a set of virtual machines distributed across a hierarchical network of two or more data centers and in connection with a set of multiple users, into at least a first set of functions and a second set of functions, wherein the first set of functions corresponds to a subset of one or more users associated with a given level of performance sensitivity, and wherein said partitioning is based on (i) a desired performance sensitivity measure associated with the multiple functions and (ii) data center sensitivity measures provided by the two or more data centers. Such an embodiment also includes deploying differentiated services among the set of multiple users by executing the first set of functions in one or more virtual machines in a first of the two or more data centers, wherein the first data center is associated with a higher data center sensitivity measure than the one or more additional data centers in the hierarchical network of data centers; and executing the second set of functions in one or more virtual machines in a second of the two or more data centers, wherein the second data center is associated with a lower data center sensitivity measure than the first data center.

Figure 11:
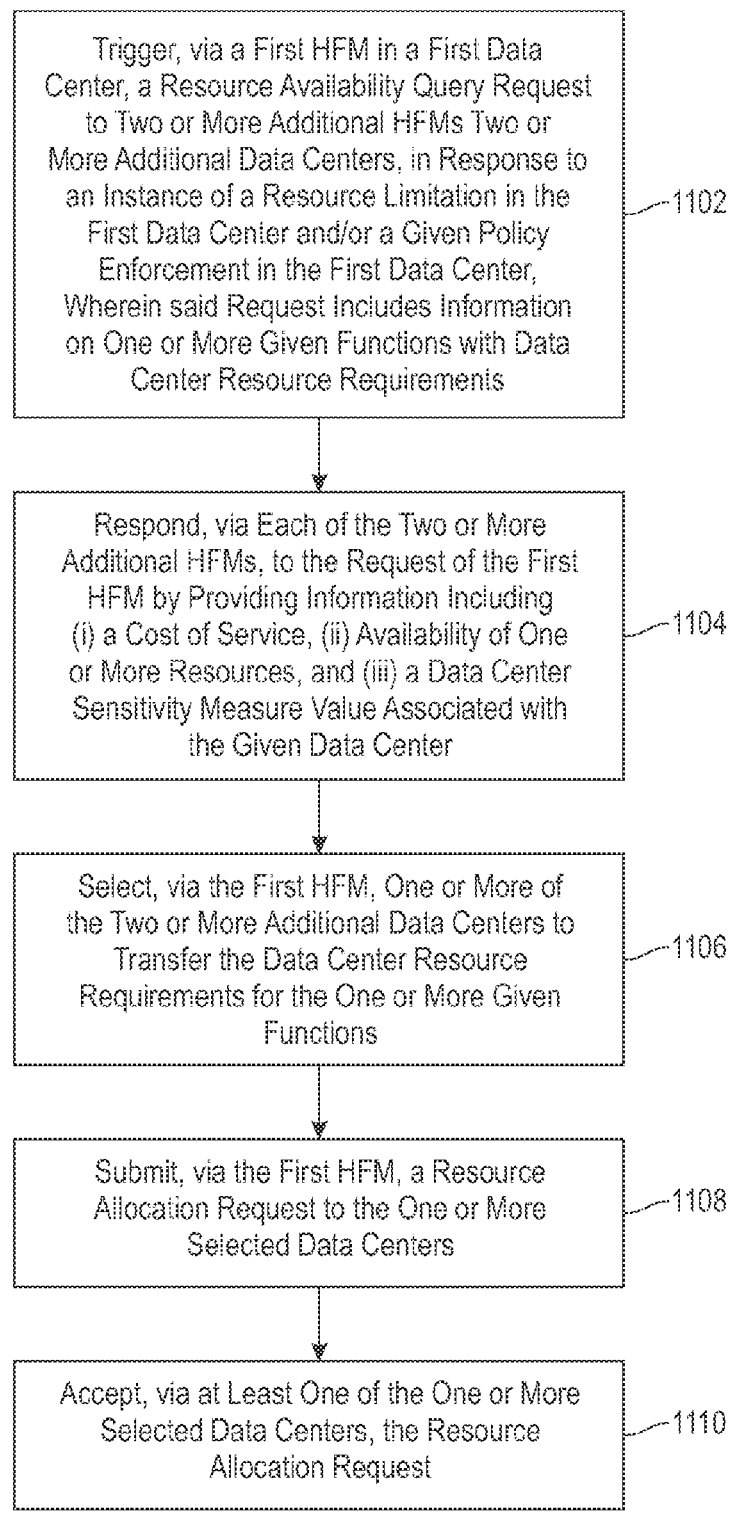
FIG. 11 is a flow diagram illustrating techniques according to an embodiment of the invention.

FIG. 11 is a flow diagram illustrating techniques according to an embodiment of the invention. Step 1102 includes triggering, via a first HFM in a first data center, a resource availability query request to two or more additional HFMs two or more additional data centers, in response to an instance of a resource limitation in the first data center and/or a given policy enforcement (such as a brown-out policy, for example) in the first data center, wherein said request includes information on one or more given functions with data center resource requirements.

Step 1104 includes responding, via each of the two or more additional HFMs, to the request of the first HFM by providing information including (i) a cost of service, (ii) availability of one or more resources, and (iii) a data center sensitivity measure value associated with the given data center. Step 1106 includes selecting, via the first HFM, one or more of the two or more additional data centers to transfer the data center resource requirements for the one or more given functions.

Step 1108 includes submitting, via the first HFM, a resource allocation request to the one or more selected data centers. Step 1110 includes accepting, via at least one of the one or more selected data centers, the resource allocation request.

The techniques depicted in FIG. 10 and FIG. 11 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 10 and FIG. 11 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 12:
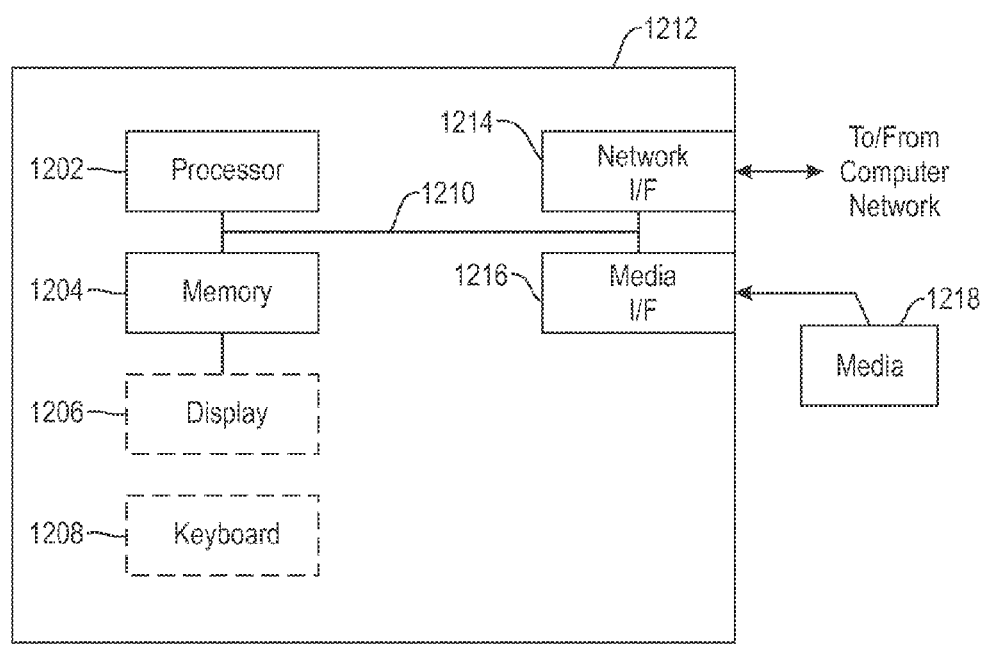
FIG. 12 is a system diagram of an exemplary computer system on which at least one embodiment of the invention can be implemented.

Additionally, an aspect of the present invention can make use of software running on a general purpose computer or workstation. With reference to FIG. 12, such an implementation might employ, for example, a processor 1202, a memory 1204, and an input/output interface formed, for example, by a display 1206 and a keyboard 1208. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 1202, memory 1204, and input/output interface such as display 1206 and keyboard 1208 can be interconnected, for example, via bus 1210 as part of a data processing unit 1212. Suitable interconnections, for example via bus 1210, can also be provided to a network interface 1214, such as a network card, which can be provided to interface with a computer network, and to a media interface 1216, such as a diskette or CD-ROM drive, which can be provided to interface with media 1218.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1202 coupled directly or indirectly to memory elements 1204 through a system bus 1210. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1208, displays 1206, pointing devices, and the like) can be coupled to the system either directly (such as via bus 1210) or through intervening I/O controllers (omitted for clarity).

Network adapters such as network interface 1214 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 1212 as shown in FIG. 12) running a server program. It will be understood that such a physical server may or may not include a display and keyboard.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 1202. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, identifying DCS-aware inter-data center network function partitioning across data centers that utilizes such inter-data center delays for processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising the following steps:
    partitioning multiple functions, within a set of virtual machines distributed across a hierarchical network of two or more data centers, into at least a first set of functions and a second set of functions, wherein the first set of functions is associated with a higher performance sensitivity measure than the second set of functions, and wherein said partitioning is based on (i) a desired performance sensitivity measure associated with the multiple functions and (ii) data center sensitivity measures provided by the two or more data centers;
    executing the first set of functions in one or more of the virtual machines in a first of the two or more data centers, wherein the first data center is associated with a higher data center sensitivity measure than the one or more additional data centers in the hierarchical network of data centers; and
    executing the second set of functions in one or more of the virtual machines in a second of the two or more data centers, wherein the second data center is associated with a lower data center sensitivity measure than the first data center;
    wherein at least one of the steps is carried out by a computing device.

2. The method of claim 1, wherein said partitioning is carried out by a hierarchical function manager in a distributed manner across the two or more data centers.

3. The method of claim 2, wherein the hierarchical function manager is assisted by a local hierarchical function manager that manages one or more functions for a local data center among the two or more data centers.

4. The method of claim 2, wherein the hierarchical function manager triggers a request for resource allocation for one or more of the multiple functions from one data center to another data center in the hierarchical network based on the availability of resources, a cost of available resources, the performance sensitivity measure associated with the one or more functions for which resource allocations are required, and data center sensitivity measures.

5. The method of claim 1, wherein the location of the first data center is closer to a user device than the second data center.

6. The method of claim 1, wherein the data center sensitivity measure is based on one or more of a latency sensitivity measure, a bandwidth availability measure, a network availability measure, a network utilization measure, a cost of service measure, a computing resource availability measure, a storage resource availability measure, dynamic link conditions on one or more networks associated with a user or set of users, and an energy availability measure.

7. The method of claim 1, wherein the performance sensitivity measure is based on one or more of an expected round trip delay, an overall latency of response, an expected bandwidth, the number of round trips required to accomplish a task, one or more computation requirements for function execution, one or more storage requirements for function execution, one or more dynamic wireless link conditions for a mobile device that utilizes a given function, and a given cost for function execution.

8. The method of claim 1, comprising:
replicating the multiple functions across the hierarchical network of two or more data centers based on an ability of the two or more data centers to meet performance sensitivity measures associated with the multiple functions.

9. The method of claim 1, wherein one or more of the multiple functions are collapsed into one of the two or more data centers to provide one or more of (i) a reduction in latencies associated with inter-function communications, (ii) an improvement in end-to-end application performance, and (iii) differentiated services for one or more users.

10. The method of claim 1, wherein the multiple functions comprise multiple network functions associated with providing a network service in the hierarchy of two or more data centers.

11. The method of claim 1, comprising:
partitioning resources across the two or more data centers to support two or more network operators; and
providing an inter-operator tunneling service between the operator networks in the hierarchical network of two or more data centers, wherein said providing comprises establishing an encrypted data tunnel between a packet gateway virtual machine of a first of the two or more network operators and a packet gateway virtual machine of a second of the two or more network operators.

12. The method of claim 1, comprising:
classifying each of the two or more data centers based on ability to respond to one or more user devices in a given geographic area and/or a networked region.

13. The method of claim 1, comprising:
splitting one of the multiple network functions into multiple sub-functions;
partitioning the multiple sub-functions into at least a first set of sub-functions and a second set of sub-functions, wherein the first set of sub-functions is associated with a higher performance sensitivity measure than the second set of sub-functions;
executing the first set of sub-functions in one or more virtual machines in the first data center; and
executing the second set of sub-functions in one or more virtual machines in the second data center.

14. The method of claim 1, wherein (i) said partitioning, (ii) said executing the first set of network functions, and (iii) said executing the second set of network functions is performed dynamically for each of multiple users.

15. The method of claim 1, wherein (i) said partitioning, (ii) said executing the first set of network functions, and (iii) said executing the second set of network functions is performed dynamically for a subset of users from multiple users, wherein the subset of users corresponds to a given criterion, and wherein the given criterion comprises one or more quality requirements of the users, one or more operator network constraints, and/or a cost of services associated with the users.

16. The method of claim 1, comprising:
dynamically placing the set of virtual machines across the hierarchical network of two or more data centers based on one or more attributes, wherein said dynamically placing comprises replicating one more of the virtual machines across the two or more data centers.

17. The method of claim 16, wherein the one or more attributes comprise (i) availability of computing resources in each of the two or more data centers, (ii) latency requirements associated with the multiple functions, (iii) capabilities of the two or more data centers to meet one or more latency requirements, (iv) a cost of service in the two or more data centers, (v) availability of storage resources in each of the two or more data centers, (vi) availability of energy resources in each of the two or more data centers, (vii) one or more link conditions associated with one or more users being served by the two or more data centers, (viii) availability of one or more networks connected to each of the two or more data centers, and/or (ix) a load on the hierarchical network of two or more data centers.

18. The method of claim 1, comprising:
interacting with one or more physical network nodes in the hierarchical network of two or more data centers to obtain a policy for a virtual machine partitioning scheme;
decoupling enforcement of the policy to implement the policy at one or more local nodes of the hierarchical network of two or more data centers; and
enforcing the policy based on one or more context attributes, wherein the one or more context attributes comprise (i) time of day, (ii) congestion in the hierarchical network of two or more data centers, (iii) cost of service in the two or more data centers, and/or (iv) requirements of one or more users and/or applications.

19. The method of claim 1, comprising:
predicting an expected usage of resources across the two or more data centers, wherein the resources comprise one or more of a computing resource, a storage resource, a networking resource, and an energy resource, and wherein said predicting is based on one or more of a static policy input, a dynamic policy input, dynamic information of resource requirements in the two or more data centers, overprovisioning of resources based on anticipated demand, and an internal estimate of dynamic usage requirements; and
determining a future allocation of resources across the two or more data centers based on said predicting.

20. The method of claim 1, comprising:
assigning a given one of the multiple functions to a given one of the two or more data centers to support a set of users based on the data center sensitivity measure corresponding to the given data center and the performance sensitivity measure corresponding to the given function.

21. The method of claim 1, comprising:
enabling a given one of the multiple functions to execute in a software container in a given virtual machine from the set of virtual machines; and
migrating the given function between two of the two or more data centers based on (i) the data center sensitivity measures of the two data centers, (ii) the performance sensitivity measure associated with the given function, and (iii) a cost of migration associated with the given function.

22. The method of claim 1, wherein said partitioning comprises:
placing one or more cloud application virtual machine functions for a given user requiring higher performance sensitivity in a cloud data center with a higher data center sensitivity measure relative to the given user.

23. The method of claim 1, comprising:
implementing function replication with concurrent utilization of a given function at two or more data center locations in the hierarchical network of data centers.

24. The method of claim 1, wherein the set of virtual machines comprises a machine-to-machine service layer service function virtual machine and/or an application proxy function virtual machine.

25. A computer program product, the computer program product comprising a computer readable storage medium having program instructions embodied therewith, the program instructions executable by a computing device to cause the computing device to:
partition multiple functions, within a set of virtual machines distributed across a hierarchical network of two or more data centers, into at least a first set of functions and a second set of functions, wherein the first set of functions is associated with a higher performance sensitivity measure than the second set of functions, and wherein said partitioning is based on (i) a desired performance sensitivity measure associated with the multiple functions and (ii) data center sensitivity measures provided by the two or more data centers;
execute the first set of functions in one or more of the virtual machines in a first of the two or more data centers, wherein the first data center is associated with a higher data center sensitivity measure than the one or more additional data centers in the hierarchical network of data centers; and
execute the second set of functions in one or more of the virtual machines in a second of the two or more data centers, wherein the second data center is associated with a lower data center sensitivity measure than the first data center.

26. A system comprising:
a memory; and
at least one processor coupled to the memory and configured for:
partitioning multiple functions, within a set of virtual machines distributed across a hierarchical network of two or more data centers, into at least a first set of functions and a second set of functions, wherein the first set of functions is associated with a higher performance sensitivity measure than the second set of functions, and wherein said partitioning is based on (i) a desired performance sensitivity measure associated with the multiple functions and (ii) data center sensitivity measures provided by the two or more data centers;
executing the first set of functions in one or more of the virtual machines in a first of the two or more data centers, wherein the first data center is associated with a higher data center sensitivity measure than the one or more additional data centers in the hierarchical network of data centers; and
executing the second set of functions in one or more of the virtual machines in a second of the two or more data centers, wherein the second data center is associated with a lower data center sensitivity measure than the first data center.

27. A method comprising the following steps:
partitioning multiple functions, within a set of virtual machines distributed across a hierarchical network of two or more data centers and in connection with a set of multiple users, into at least a first set of functions and a second set of functions, wherein the first set of functions corresponds to a subset of one or more users associated with a given level of performance sensitivity, and wherein said partitioning is based on (i) a desired performance sensitivity measure associated with the multiple functions and (ii) data center sensitivity measures provided by the two or more data centers; and
deploying differentiated services among the set of multiple users by:
executing the first set of functions in one or more of the virtual machines in a first of the two or more data centers, wherein the first data center is associated with a higher data center sensitivity measure than the one or more additional data centers in the hierarchical network of data centers; and
executing the second set of functions in one or more of the virtual machines in a second of the two or more data centers, wherein the second data center is associated with a lower data center sensitivity measure than the first data center;
wherein at least one of the steps is carried out by a computing device.

* * * * *